US012739435B2

(12) United States Patent
Mackin

(10) Patent No.: US 12,739,435 B2
(45) **Date of Patent: *Sep. 15, 2026**

(54) METHOD FOR IMAGE ENCODING

(71) Applicant: MBDA UK Limited, Stevenage (GB)

(72) Inventor: Alex Mackin, Filton (GB)

(73) Assignee: MBDA UK LIMITED, Stevenage (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/875,651

(22) PCT Filed: Jun. 16, 2023

(86) PCT No.: PCT/GB2023/051586
§ 371 (c)(1),
(2) Date: Dec. 16, 2024

(87) PCT Pub. No.: WO2023/242592
PCT Pub. Date: Dec. 21, 2023

(65) Prior Publication Data

US 2025/0386052 A1 Dec. 18, 2025

(30) Foreign Application Priority Data

Jun. 16, 2022 (EP) .................................... 22179464
Jun. 16, 2022 (GB) .................................... 2208883
(Continued)

(51) Int. Cl.
*H04N 19/625* (2014.01)
*H04N 19/61* (2014.01)
*H04N 19/91* (2014.01)

(52) U.S. Cl.
CPC .......... *H04N 19/625* (2014.11); *H04N 19/61* (2014.11); *H04N 19/91* (2014.11)

(58) Field of Classification Search
CPC ....... H04N 19/625; H04N 19/61; H04N 19/91
See application file for complete search history.

(56) References Cited

U.S. PATENT DOCUMENTS 5,150,433 A 9/1992 Daly
5,471,655 A 11/1995 Kivari
(Continued)

FOREIGN PATENT DOCUMENTS

CN 101155302 A 4/2008
EP 0838926 A2 4/1998
(Continued)

OTHER PUBLICATIONS

International Search Report dated Jul. 24, 2023 issued in PCT/GB2023/051586.

(Continued)

*Primary Examiner* — Richard T Torrente
(74) *Attorney, Agent, or Firm* — Scully, Scott, Murphy & Presser, P.C.

(57) ABSTRACT

A method for encoding data defining an image is disclosed. The method comprises segmenting the image into image blocks having a uniform size; and applying a frequency-based transform to each resulting in transformed image data in which the image data is represented as coefficients defining a linear combination of predetermined basis functions having different spatial frequencies, with each block of transformed image data having one coefficient for a zero frequency basis function, and a plurality of coefficients for higher frequency basis functions, which are grouped into one or more sub-bands. The blocks of transformed image data are grouped into slices, and the coefficients are converted into binary code using an allocation method to allocate bits associated with coefficients in each sub-band in a slice amongst-substantially same length bins. Bits associated with each sub-band in each slice are assigned to a bin (Continued)

and transferred, if needed, to achieve the substantially same length.

20 Claims, 9 Drawing Sheets

(30) Foreign Application Priority Data

Apr. 13, 2023 (GB) ...................................... 2305423
Apr. 13, 2023 (GB) ...................................... 2305424

(56) References Cited

U.S. PATENT DOCUMENTS

| | | | | |
|---|---|---|---|---|
| 5,671,156 | A | 9/1997 | Weerackody et al. | |
| 12,407,829 | B2 * | 9/2025 | Deng | H04N 19/117 |
| 2007/0223380 | A1 | 9/2007 | Gilbert et al. | |
| 2008/0037954 | A1 | 2/2008 | Lee et al. | |
| 2016/0080185 | A1 | 3/2016 | Pang et al. | |
| 2017/0236240 | A1 | 8/2017 | Maas et al. | |
| 2021/0099699 | A1 * | 4/2021 | Pan | H04N 19/182 |
| 2023/0247201 | A1 * | 8/2023 | Alshina | H04N 19/182 375/240.03 |

FOREIGN PATENT DOCUMENTS

| | | | |
|---|---|---|---|
| JP | S60119145 | A | 6/1985 |
| RU | 2010127327 | A | 1/2012 |
| WO | 2001001702 | A1 | 1/2001 |
| WO | 2021067278 | A1 | 4/2021 |

OTHER PUBLICATIONS

Written Opinion dated Jul. 24, 2023 issued in PCT/GB2023/051586.
GB Search Report dated Dec. 13, 2022 issued in GB 2208883.5.
Extended European Search Report dated Dec. 9, 2022 received in European Patent Application No. 22179464.7.
Redmill, D. et al., "The EREC: An Error-Resilient Technique for Coding Variable-Length Blocks of Data", IEEE Transactions on Image Processing, Apr. 1, 1996, pp. 565-574, vol. 5, No. 4.
Chandramouli, R. et al., "Adaptive Quantization and Fast Error-Resilient Entropy Coding for Image Transmission", IEEE Transactions on Circuits and Systems for Video Technology, Aug. 1, 1998, pp. 411-421, vol. 8, No. 4.
Puri, A. et al., "Adaptive frame/field motion compensated video coding", Signal Processing. Image Communication, Feb. 1, 1993, pp. 39-58, vol. 5, No. 1-2.
Valin, J. et al., "Perceptual Vector Quantization For Video Coding", arxiv.org, Cornell University Library, Feb. 16, 2016, DOI: 10.1117/12.2080529.
Chou, P. et al., "Multimedia over IP and Wireless Networks: Compression, Networking, and Systems", Mar. 30, 2007, pp. 1-712.
GB Search Report dated Oct. 27, 2023 issued in GB 2305424.0.
GB Search Report dated Nov. 13, 2023 issued in GB 2305423.2.
Keys, R., "Cubic convolution interpolation for digital image processing", IEEE Transactions on Acoustics, Speech, and Signal Processing, Dec. 1981, pp. 1153-1160, vol. ASSP-29, No. 6.
Liang, J. et al., "Approximating the DCT with the lifting scheme: systematic design and applications", Conference Record of the Thirty-Fourth Asilomar Conference on Signals, Systems and Computers (Cat No. 00CH37154), 2000, pp. 192-196, vol. 1.
Marpe, D. et al., "A Fast Renormalization Technique for H.264/MPEG4-AVC Arithmetic Coding", 51st Internationales Wissenschaftliches Kolloquium, Ilmenau, 2006, pp. 1-14.
Morita, H. et al., "Design and Analysis of Synchronizable Error-Resilient Arithmetic Codes", GLOBECOM, 2009, pp. 1-6.

* cited by examiner

Image portioning
200
210
Downsample

300
Block Partition
400

Prefilter and transform
500

Checkerboard A
610
Checkerboard B
620

Flatten
1310
1320
1330
1340
1350
Stack all components within slice
1360
Combine with all slices in partition
1370
Combine all partitions
1380
1 0 1 1 0 0 0 1
Interleave
1390
1 0 1 0 0 0 1 1
To Channel Data gets written
Data gets read
Data
No Data
1410
1420

Bit Error Rate vs PSNR: 10 Mbps
PSNR (dB)
Bit Error Rate
1510
1520
1530
1540
1550
RIDLE
JPEG
J2K
H.264
HEVC
50
45
40
35
30
25
20
15
10
5
0
10-8
10-7
10-6
10-5
10-4
10-3
10-2
10-1

METHOD FOR IMAGE ENCODING

FIELD

The present invention relates to a method for encoding an image, for example to provide data suitable for wireless transmission. The invention further relates to a method of decoding such data.

BACKGROUND

A number of methods for encoding image data are known. For example, the JPEG algorithm is widely used for encoding and decoding image data. In general the focus for such algorithms is the ability to retain high quality images whilst reducing the amount of data required to store the image. This reduction in the amount of data required to store an image results in more rapid transmission of images. Such compression algorithms are a key enabler for streaming of high quality video.

SUMMARY

According to an aspect of the present invention, there is provided a method for encoding data defining an image, the method comprising the steps of:

(a) segmenting the image into image blocks, the image blocks having a uniform block size;

(b) applying a frequency-based transform to each of the image blocks, thereby providing transformed image data in which the image data is represented as coefficients defining a linear combination of predetermined basis functions having different spatial frequencies; such that each block of transformed image data comprises one zero-frequency coefficient for a zero frequency basis function, and one or more sub-bands of higher-frequency coefficients, each of the one or more sub-bands comprising a number of coefficients for a predetermined set of the higher frequency basis functions;

(c) grouping the blocks of transformed image data into slices, each slice comprising a plurality of blocks of transformed image data;

(d) converting the coefficients into bits of binary code, the zero-frequency coefficients being converted to binary code using a fixed length coding scheme, and the higher frequency coefficients being converted to binary code using a variable length coding scheme;

and, for each slice, allocating the bits representing said each slice to a position in a bitstream using an allocation method, the allocation method comprising:

(i) defining a number of bins in the bitstream, the bins each having a uniform size, and each of the bins having an associated one of the plurality of blocks;

(ii) allocating bits representing a selected one of the one or more sub-bands of each of the plurality of blocks to the bin associated with said each of the plurality of blocks;

(iii) if the number of bits in a first of the bins is greater than the uniform size, transferring excess bits to a second of the bins, the second of the bins being selected according to a predetermined order;

the allocation method being such that each bin starts with bits representing its associated block; and repeating the allocation method for all of the one or more sub-bands.

Limiting the application of the bit allocation scheme to working across a single slice enhances the resilience of the encoded data, since it limits the potential for an error to propagate. The length of the slice can be a configurable parameter for this reason, since shorter slices are more resilient to data corruption during transmission, but require greater processing power and bandwidth to encode. Additionally, because the bit allocation scheme is applied to sub-bands, rather than to entire blocks, the zero frequency coefficients are retained separately and can still be used in isolation to produce a decoded image (albeit of relatively lower quality) in the event that entire slices are corrupted during transmission.

The allocation method may be repeated iteratively. The allocation method may be terminated after a predetermined number of iterations have been completed. This ensures that the processing does not carry on indefinitely when only a small number of bits remain to allocate amongst otherwise substantially uniformly packed bins.

The number of bins may be equal to the number of blocks in the slice.

The method may further comprise the step of grouping the blocks into two or more sets of blocks, prior to grouping the blocks into slices. Grouping the blocks into sets further reduces the potential for errors arising from transmission to propagate through the image. The step of grouping may be performed such that the blocks in any one of the sets do not share any boundaries. There may be two sets of blocks, and the two sets may interlock. Such an arrangement facilitates the application of error concealment techniques in the event that one set of blocks is corrupted.

Each slice may comprise a number of consecutive blocks in one of the sets of blocks.

Each slice may comprise a reference block, and the method further comprising the step of replacing the each of the coefficients in subsequent blocks in said each slice with a prediction, the prediction being based on a corresponding coefficient in the reference block. For example, the prediction for the zero frequency coefficients in a slice may be the difference between a zero frequency coefficient for a current image block and a zero frequency coefficient for an immediately preceding image block. Using prediction helps to compress the amount of data required to define the image, but risks propagation of errors from one block to another. Resilience is enhanced by limiting prediction to blocks within a single slice.

The step of converting the coefficients into binary code may comprise applying binary arithmetic coding using a probability model. The probability model may be tailored based on a sample set of representative images. The encoding can thus be tailored to images of a particular type; for example images of a particular modality obtained using a specific wavelength band (such as infrared or visible wavelengths) or representative subject matter.

The coefficients for each of the one or more sub bands may be arranged in a predetermined order so as to form a vector, which vector has a gain and a unit length direction, and the unit length direction may be quantised by constraining its component terms to be integers, and constraining the sum of those component terms to be equal to a predetermined value K. Such vectors may be used for prediction of the non-zero frequency coefficients.

According to a second aspect of the present invention, there is provided a method of decoding a bit stream to reconstruct an image, which image has been encoded according to the above method, the method of decoding comprising inverting the steps performed in encoding the image. The method of decoding can be performed by a decoder. The decoder can be provided with a number of parameters, to enable the decoding of the image. Exemplary parameters might include the bin length, the number of blocks in a slice, an end of slice codeword, the overall image size, the value K, the block size, the number of sub-bands in a block, and the waveband of the image encoded. One or more of these parameters may be included, and it will be possible to include other parameters instead or as well as these, as well as other information relating to the encoding. These parameters may be included in an image header, for example by means of a codeword that defines an encoding mode. The parameters may be predetermined so that the decoder can be programmed with certain parameters. For example, the number of blocks in a slice may be predetermined, and thus known by the decoder, or can be included in the image header such that it is a parameter that the encoder can vary as appropriate for a particular application or environment. The allocation method used to position bits relating to a sub-band in the bins for a slice can also be predetermined, so that it is known to the decoder. The decoder is then able to invert the steps of the allocation method so as to identify the bits relating to a sub band for each of the blocks in the slice, using the end of slice codeword.

The decoder is therefore able to identify the bits representing each of the sub-bands in a slice. The decoder is therefore also able to identify the bits representing the zero frequency coefficients in a slice. The decoding method may further comprise identifying, in each block in the slice, one or more sub-bands, each of the one or more sub-bands comprising a number of coefficients for a predetermined set of the higher frequency basis functions. Parts of the coefficients for each of the one or more sub-bands may be arranged as vectors, and the decoder may identify the components of the vectors. The decoder may be provided with a predetermined value K.

The method of decoding may further comprise the step of checking that the components terms sum to the predetermined value K. If the component terms do not sum to the predetermined value K, an error may be identified. If the component terms do not sum to the predetermined value K, the largest component term may be adjusted such that the component terms sum to the predetermined value K.

The method of decoding may further comprise imposing a cap on the magnitude of predicted coefficients. The cap may be applied only to the zero frequency coefficients. Images of real subjects tend not to exhibit dramatic change across small length scales, and so above a certain level, large changes in value of the coefficients are likely to be indicative of an error. Imposing the cap mitigates the effect of the error. The cap may be a fixed cap. The cap may alternatively be depended on the magnitude of the reference coefficient. The cap may vary as a percentage of the reference coefficient, subject to a minimum value cap.

The invention extends to a method of encoding a series of image frames including at least a current frame and a preceding frame, each of the frames being encoded according to the method described above.

The invention further extends to a computer-readable medium having stored thereon data defining an image, which data has been encoded according to the method of described above.

The invention further extends to a computer program product comprising instructions which, when the program is executed by a computer, cause the computer to carry out the method described above.

The invention further extends to a processor configured to perform the method described above.

BRIEF DESCRIPTION OF THE FIGURES

Embodiments of the invention will now be described by way of example only with reference to the figures, in which.

DETAILED DESCRIPTION

Embodiments of the present invention provide a method for encoding data defining an image to provide an image data file that offers increased robustness to data losses. Such data losses may occur as a result of wireless transmission of the image data file, and robustness to such data losses can enable receipt of a useable image rather than total image loss. It will be understood that such robustness may result in a loss of eventual image quality when the image data file is decoded, although this is not necessary. By useable, it will be understood that the image data retains its integrity, such that the image can be reconstructed from the data and subsequently can be interpreted by a human operator, or by a computer performing a suitable image processing algorithm. Interpretation of the image may for example include detection or classification tasks, or any extraction of useful information from the reconstructed image.

1. Overview

Figure 1A:
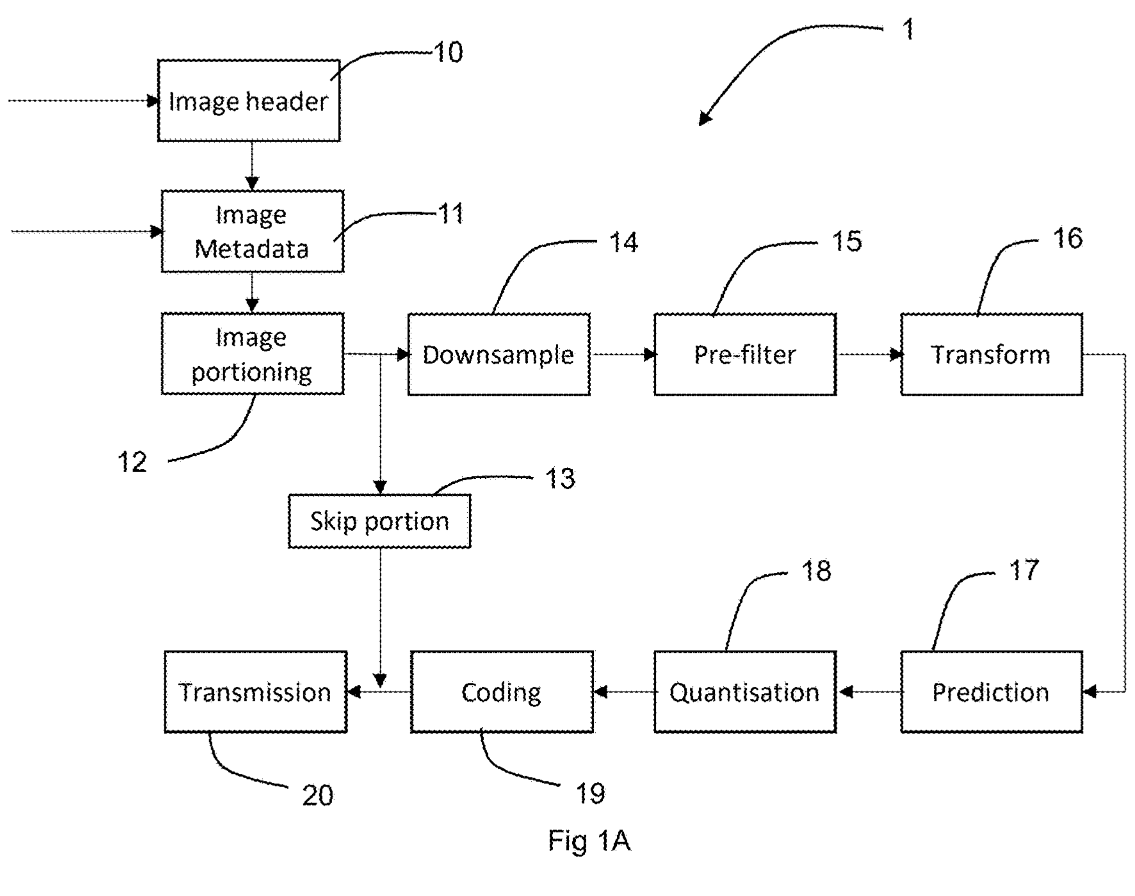
FIG. 1A shows a schematic flow diagram illustrating a method of encoding data defining an image according to an example of the invention.

FIG. 1A is a schematic flow diagram 10 illustrating the steps performed in a method for encoding data defining an image. These steps will now be described at a general level, with further detail on their implementation provided in the following sections.

At step 10, an image header is provided. The image header contains the data defining the parameters used in the encoding process, and as such corruption in the image header can cause the complete loss of the image. The number of header bits is therefore kept small and of fixed length for each frame.

At step 11, metadata associated with the image is provided. The metadata includes information relevant to interpreting the image. For example, the metadata may include a timestamp indicating the time at which the image was captured; a frame number to indicate the relative position of the image in a sequence of images; information relating to how the image was captured, such as the waveband in which the image was captured, information identifying the sensor that captured the image and the parameters applied to the sensor during image capture; and/or information relating to preliminary image processing performed, such as information identifying a region of interest in the image (for example, a target or subject of the image identified by means of indicating the position and size of a box around the target or subject).

Figures 2, 3, 4, 5, 6:
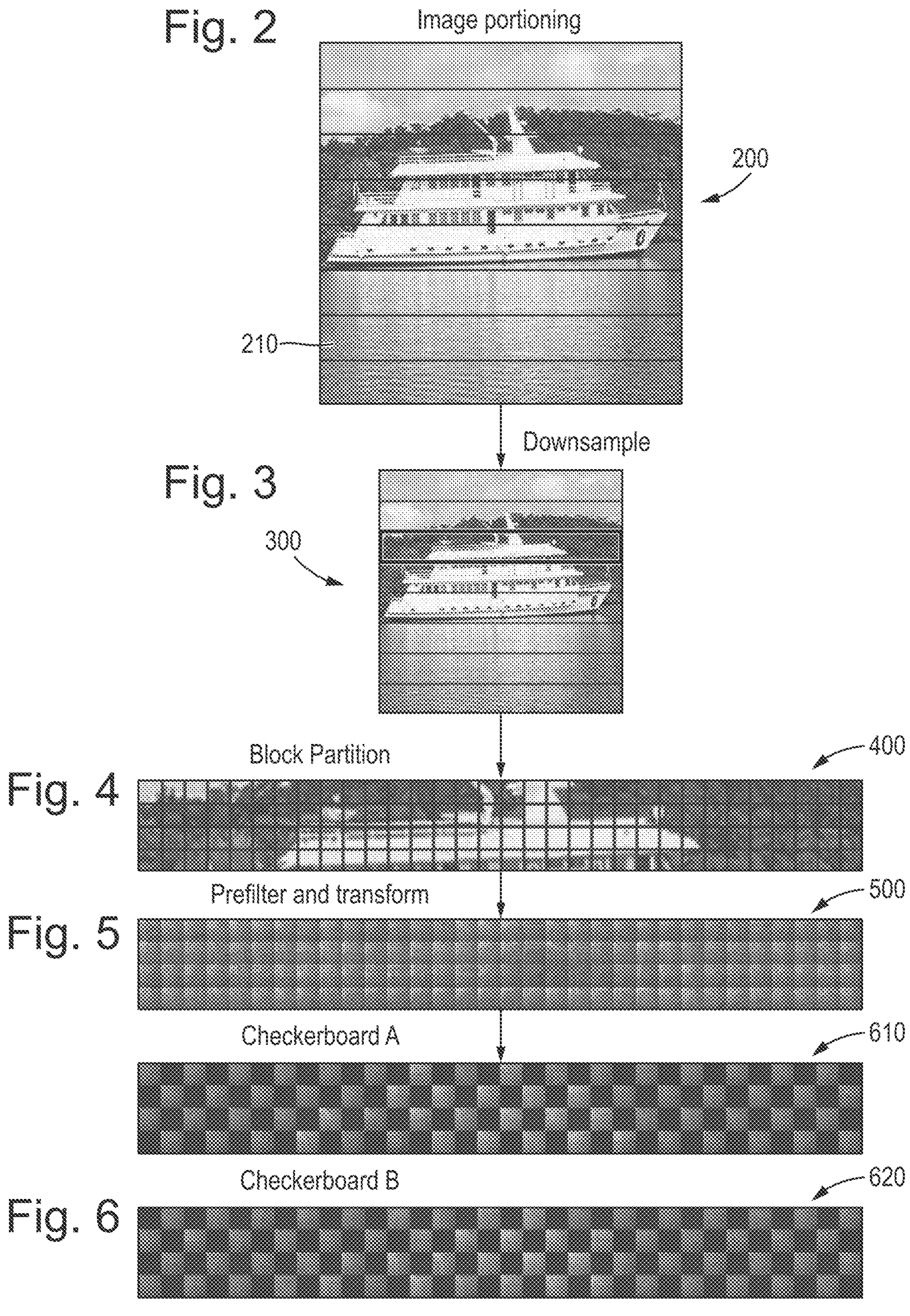
FIG. 2 shows an image split into image portions in a step of a method according to an example of the invention.
FIG. 3 is an illustration of the image of FIG. 2 after downsampling in a step of a method according to an example of the invention.
FIG. 4 shows the a portion of the image of FIG. 3 segmented into blocks in a step of a method according to an example of the invention.
FIG. 5 is a schematic illustration of the blocks of FIG. 3 as transformed after application of a pre-filter and transform in a step of a method according to an example of the invention.
FIG. 6 is an illustration of the partition of the transformed blocks of FIG. 5 into two sets in a step in a method according to an example of the invention.

At step 12, the image is split into portions. An example of an image portion 210 is shown in FIG. 2. Each image portion is processed independently of the others in the subsequent encoding steps. This enables each image portion to be transmitted as soon as its encoding has completed, and so reduces latency. Since the image portions are processed independently, a useable image can still be obtained even if transmission losses result in complete failure for one image portion. Moreover, by splitting the image into portions, any errors arising from, for example, transmission losses, are constrained to be within one portion. This enhances robustness of the encoding/decoding process. In some cases, an image portion may be skipped, as illustrated at step 13. Each image portion for processing is further segmented into blocks.

At step 14, the image portion is downsampled. Downsampling reduces the information content in the image and can be done without significant loss of quality in the transmitted image. It should be noted that the amount of downsampling is dependent on the image being coded, and it will be possible to omit this step, particularly for relatively smaller-sized images. Pre-filters are optionally applied at step 15. The subsequent transform step can result in artefacts in the final image arising from the segmentation into blocks. As is explained in further detail below, the application of pre-filters can mitigate these artefacts. Of course, the pre-filter step can be omitted at the cost of retaining these artefacts.

At step 16, a transform is applied to each block. The transform is a frequency based transform, such as a discrete cosine transform. The purpose of the transform is to represent the image data as a linear combination of basis functions. The image data is thus transformed into a series of coefficients of different frequency basis functions. Frequency based transforms are typically used for image compression because in natural imagery information tends to be concentrated in low frequency components. Higher frequency components can therefore be stored at lower resolution, or often set to zero as a result of the subsequent quantisation step.

At step 17, prediction is performed. Typically, when ordered from low frequency to high frequency, the coefficients are highly correlated and this can be exploited by capturing the difference between one coefficient and the next, rather than the actual coefficient itself. This is known as prediction, and can be used to compress the image data. Similarly, neighbouring blocks in images are also often highly correlated, and prediction can therefore be applied both within individual blocks and (particularly for zero-frequency coefficients) between blocks. In the event of transmission errors, the use of prediction can lead to significant problems, since loss of one coefficient results in loss of all coefficients predicted from that one coefficient. Prediction is therefore only applied to a limited extent to preserve resilience; or in some embodiments may be omitted.

At step 18, quantisation is performed. Quantisation further reduces the amount of data required to encode the image information by mapping the coefficients onto a limited number of pre-defined values. Various quantisation algorithms are known and can be used in the present method. Typically a quantisation level can be specified and varied, the quantisation level being, in broad terms, related to the resolution of the predefined values, and therefore to the amount of information compression that is achieved by the quantisation step. In one example quantisation scheme, coefficients for each basis function may simply be rounded. Other quantisation algorithms, described in further detail below, can also be used, and may retain a higher image output quality for a given amount of information compression, or have advantages in terms of robustness.

Encoding of the data into binary form is performed at step 19. Various methods are known for encoding data, such as variable length coding and fixed length coding. The coded data for the different blocks is multiplexed together. This results in a bit stream suitable for transmission at step 20. As is described in further detail below, a number of steps can be performed during coding to enhance resilience and robustness of the resulting bitstream. These can include application of error resilient entropy coding, and alternatively or additionally, interleaving the bit stream. The bitstreams for each of the image portions can be concatenated prior to interleaving. It should be noted that the interleaving can be integrated into the coding process, rather than being a step performed during transmission by a separate dedicated apparatus.

Alternatively to immediate transmission, the bit stream may be stored in memory, or another suitable storage medium, portable or otherwise, for decoding at a later point in time as may be convenient. It can be stored in a bespoke file format.

Decoding the bitstream, so as to obtain an image from the coded data, is achieved by reversing the steps outlined above. Additionally an error concealment algorithm may be applied as part of the decoding.

Figure 1B:
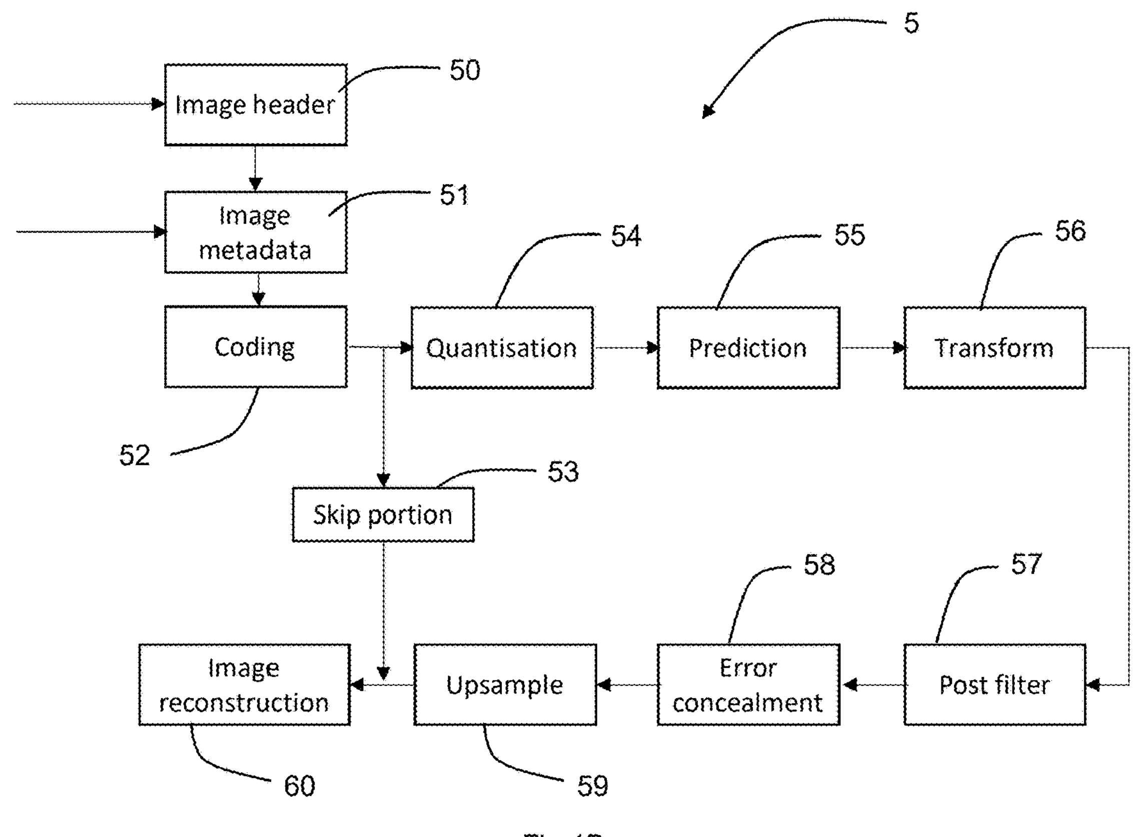
FIG. 1B shows a schematic flow diagram illustrating a method of decoding a bit stream to reconstruct an image according to an example of the invention.

FIG. 1B is a schematic flow diagram 50 illustrating the steps performed in a method for decoding data defining an image. The data is received and the image header is read at step 51. The image header contains information relating to the parameters needed by the decoder to decode the image. The image metadata is read at step 51.

At step 52, the binary code is translated to an appropriate form for subsequent processing, reversing the coding performed at step 19.

At step 53, any skipped image portions are replaced, for example (where the image is part of a sequence of images in video) with the corresponding image portion from a previous frame.

At step 54, any reconstruction necessary for quantised data is performed. If the quantisation is simple mapping of values to a constrained set, no reconstruction may be necessary. For more complex quantisation algorithms, however, such as the techniques described further below, some reconstruction may be necessary. As described further below, this step may assist in identifying any errors that have occurred during transmission or storage of the data.

At step 55, predicted values for coefficients are used to recover the actual values of the coefficients. This step simply reverses the prediction step used during encoding at step 17.

At step 56, the inverse of the frequency based transform is applied; and at step 57, a post filter is applied. The post filter inverts the pre-filter applied at step 15.

At step 58 error concealment can be applied. Error concealment may for example be based on values from neighbouring blocks where errors are detected; or may simply directly use values from neighbouring blocks.

At step 59, the data is upsampled as desired; and at step 60 the image portions are recombined to form the whole image.

2. Processing Components

An example of the invention provides a method of encoding and decoding (a codec) an image. The method of decoding an image follows the method of encoding an image, but in reverse. In the following, an exemplary method of encoding an image is described, with only the specific steps for decoding an image that differ from the reverse of the encoding method described.

2.1 Image Header

An image header is applied to the beginning of the coded data stream to determine the different configurable parameters that can be selected for coding the image. A small number of encoding modes are defined. Each mode specifies a different set of parameters determining how resilient the coded image is to data loss or corruption during transmission, and how much the image data will be compressed. The encoding mode may also specify, for example, whether or not the resulting coded image is to be of fixed or variable size; or whether individual image portions are to be of fixed or variable size. For example, eight different modes can be used. Fewer modes can be used, for example if image resolution and compression can be fixed; or more modes can be used if there is a greater variety of image resolution.

The image header includes an indication of which encoding mode is used. Where eight different modes are used, as in the present example, a binary codeword of only three bits are needed. This reduces the length, and therefore the potential for corruption, of the image header. This binary codeword can be repeated a fixed number of times, and a voting procedure applied to each bit in the binary codeword to ensure that the correct encoding mode is used the vast majority of times. For example, the binary codeword may be repeated five or ten times. This enhances the robustness of the image code, since loss of the image header can result in complete loss of the image. Even with the use of repetition, the header may still be lost. However its likelihood is significantly reduced: for a bit error rate of one in one hundred bits (i.e. $10^{-2}$), repeating the encoding binary codeword five times results in a likelihood of catastrophic image loss of roughly 1 in 1,000,000.

2.2 Image Netadata

Metadata associated with the image can be provided from the image sensor itself, or from a processor associated with the image sensor. Such image metadata may include simple timestamps indicating the time at which an image was captured. However, as described above, the metadata may include any information associated with the image for the purposes of later interpretation of that image. Image metadata can be critical for later use of an image. It can be critical to know the time at which an image was captured, for example, if that image is to be used by a subsequent tracking algorithm to track a target's motion.

The image metadata is encoded as a bitstream separately from the image. It is repeated a number of times, for example five times. At decoding, a simple voting procedure can be used to ensure that each bit is correctly decoded. This can be the same as the voting procedure used for the header information. As with the header, the repetition of the metadata significantly reduces the risk of metadata loss.

2.3 Image Portioning

A received image is split into a number of image portions for subsequent processing. Each portion is a simple portion of the raw image data, comprising a strip of the image. FIG. 2 shows an example image 200 split into a number of portions, such as portion 210. The size of the image portion is selected as to balance the competing requirements of latency, which is reduced as the image portion size becomes smaller, since the image portion can be transmitted as soon as its encoding is complete, and robustness, which can be reduced as the image portion size is reduced and more portions are required to process the entire image. Whilst the use of image portions inherently increases robustness as a result of the constraining of errors to one image portion, rather than the whole image, use of too large a number of portions increases the likelihood of resynchronisation problems when errors occur (as each image portion is variable in terms of bandwidth). Different encoding parameters can be specified for each image portion. For example, block size and quantisation level can be varied between portions. Changing the encoding parameters for particular image portions enables Region of Interest (ROI) coding. Portions which contain salient information can be encoded at a higher quality than those portions containing background information. To support this capability, it first needs to be understood which portions contain salient information. This can be achieved using existing image processing techniques to select the appropriate encoding parameters for each portion. Selected encoding parameters are provided to the decoder, for example by means of a header packet associated with each image portion. The image portion headers can also include the size, in terms of a number of bits, of each image portion. This results in a small increase in the amount of data required to transmit the information. In addition there is a risk of data corruption and consequent loss of useful image data, although, because of the use of image portions, any loss is isolated to the respective portion. Such risks can be mitigated by using repeated sending, and applying a voting procedure, as described above with reference to the image header.

It may be decided to entirely skip an image portion from subsequent processing in certain circumstances. This may be, for example, when very high compression ratios are desired, and it is possible to skip particular portions containing only limited salient information; or if the transmission channel is particularly noisy. When the processing of a particular portion is skipped, it can be replaced in the final coded data by the data from the previous image, if the image is part of a sequence of images forming a video feed; or it can simply be represented as blank. Before it is decided to skip an image portion, a metric is computed between frames to check the level of motion. If motion is negligible, then a skip portion can be selected by the encoder.

In subsequent processing, each of the image portions are processed independently. This supports resilience against data loss or corruption during transmission. In addition, the processing can be performed in a multi-threaded implementation, with each image portion being processed as an independent thread. For a multi-threaded implementation, the length of the encoded binary stream for each image portion can be included in the header information, so that each thread of the decoder knows which section of memory to read. In the case of a multithreaded implementation, once the portions are split, each portion is assigned to a thread. If there are more portions than threads, the portions may be queued for particular threads. The processing described in the following is done independently for each of the portions on different threads. The processing results in a bitstream for each of the image portions. These bitstreams can be concatenated prior to any interleaving step, which can enhance robustness as burst errors will be spread across a number of image portions, rather than affecting only one portion. It is also possible, subsequent to a portion encoding being completed, to immediately transmit the portion. In this case the bitstreams for each portion may be interleaved independently of the other portions prior to transmission. Such an implementation may increase processing speed by a factor up to the number of threads. Alternatively, the processing can be performed in a single thread. This can be beneficial for simplicity in some applications.

2.4 Down-Sampling

Natural imagery exhibits a high degree of spatial redundancy. As a result in-loop filters and resampling techniques can be exploited to down-sample imagery/videos at the encoder, and then up-sample at the decoder with only small reductions in image quality. Down-sampling brings considerable benefits for data compression, since it results in smaller imagery, and therefore a smaller number of blocks need to be processed. FIG. 3 shows an image 300 that is obtained by down-sampling on the sample image of FIG. 2. Image 300 is smaller than image 200. The amount of down-sampling can be configured in light of the type of images being processed. For example, an image of size 640 by 480 pixels may for example be down-sampled by a factor of 2 or 4. A greater down-sampling factor may be applied for higher resolution images, or where a higher compression ratio of the image data for transmission is of greater importance. Any down-sampling factor can be applied as appropriate for the image being processed, and either integer or non-integer factors can be used.

In the present example, bicubic resampling is used. Bicubic resampling (see "Cubic convolution interpolation for digital image processing", IEEE Transactions on Acoustics, Speech, and Signal Processing 29 (6): 1153-1160) was found to provide a good balance between computational complexity and reconstruction quality.

2.5 Image Portion Segmentation

Each image portion for processing is segmented into separate M×M blocks of pixels. Segmenting reduces memory requirements, and limits the size of the visible artefacts that may arise due to compression and/or channel errors. An example of this segmentation process is shown in FIG. 4, in which image portion 400 is split into a number of blocks of uniform size with M equal to eight. It is possible to use different size blocks, or to adaptively select the block size. Smaller block sizes provide improved rate-distortion performance in areas with high change, such as at edges, whereas larger block sizes are preferred for flat textures and shallow gradients. Adaptively searching for the optimal segmentation requires considerable computation time, and also limits robustness, since additional segmentation parameters must be passed to the decoder. In the present example these two requirements are balanced by selecting from a limited number of block sizes at the image portion level. Thus each image portion can have a different block size; and more specifically, in the present example, the possible block sizes are M=4, M=8, or M=16. Each encoding mode uses a specific block size or combination of block sizes, and so block size information is encapsulated in the image header.

2.6 Pre/Post Filters

Encoding algorithms that segment an input image into blocks can result in artefacts in the image obtained on decoding the stored image. These artefacts occur especially at high compression ratios. It can be beneficial, both perceptually and for algorithmic performance, if such artefacts are constrained to low spatial frequencies. This is because artefacts at low spatial frequencies do not typically impede either the functioning of algorithms for the detection of potential objects of interest, or the interpretation of the image by a human viewer. Both detection algorithms and human perception typically search for signatures at high spatial frequencies, such as shapes or edges.

Blocking artefacts occur particularly when the transform used is symmetric, as then block edges introduce strong discontinuities. When the inverse transform is applied during the decoding process, spatial errors introduced by the quantisation step cause misalignment in the block edges, resulting in visible artefacts in the decoded image. There are a number of ways of mitigating the problems associated with blocking artefacts. For example, lapped filters can be used before transformation. Lapped filters are filters that are applied across the block boundaries. A number of suitable filters exist. Alternatively, deblocking filters can be used during the decoding process. Deblocking filters, however, do not directly address the underlying issues that cause the artefacts. In the present example, therefore, a lapped filter is used.

In general terms, lapped filters function to alleviate the problem of blocking artefacts by purposely making the input image blocky, so as to reduce the symmetric discontinuity at block boundaries. When a suitable lapped filter is paired with a suitable transform, such as a direct cosine transform, the lapped filter compacts more energy into lower frequencies. A further benefit of the use of lapped filters is that the filter used can be designed specifically for the image modality (for example, infra-red images; synthetic aperture radar images, or images in the visible spectrum). Thus the image codec can be modified for a specific modality without a complete redesign of the codec being necessary.

In the present example a lapped filter P is applied across M×M groups of pixels throughout the image portion. Each group of pixels spans two neighbouring blocks. The structure of P can be designed to yield linear-phase perfect reconstruction filter bank:

$$P = W_M D_M W_M$$

where:

$$W_M = \frac{1}{\sqrt{2}}\begin{bmatrix} I_{M/2} & J_{M/2} \\ J_{M/2} & -I_{M/2} \end{bmatrix}$$

$$D_M = \begin{bmatrix} I_{M/2} & Z_{M/2} \\ Z_{M/2} & V \end{bmatrix}$$

$I_{M/2}$ and $I_{M/2}$ are M/2×M/2 identity and reversal identity matrix respectively, and $Z_{M/2}$ is an M/2×M/2 zero matrix. Thus, for M=8, $I_{M/2}$, $J_{M/2}$, and $Z_{M/2}$ are four by four matrices. V is a four by four matrix that uniquely specifies the filter. It can be refined for particular image types or image modalities, so that the filter can be tailored for the image type that the encoding is to be performed on. The matrix V is obtained by optimising with respect to coding gain, using suitable representative imagery, and a suitable objective function. For example, the objective function may be the mean squared error:

$$\mathcal{L} = \frac{1}{HW}\sum_{i=1}^{H}\sum_{j=1}^{W}\left(I_{i,j} - \hat{I}_{i,j}\right)^2$$

where $I_{i,j}$ are the original, and $\hat{I}_{i,j}$ the reconstructed image pixel values, and H and W are the height and width of the image in pixels respectively. The reconstructed image pixel values are those obtained after encoding, transmission and decoding. This exemplary objective function models the impact of channel distortions such as bit-errors end-to-end.

The optimisation can be performed by calculating the objective function for each block in a frame, and then calculating an average value for the frame. V is determined as the four by four matrix which minimises the average value thus obtained. The optimisation can be extended to calculate an average of the objective function over a number of frames. It will be understood that such an optimisation may enhance resilience, since the objective function models channel distortions that impact the image during transmission.

By changing the modality of the representative imagery, the filter can be tailored to a particular image modality. Thus, to tailor the image for use with infrared images, the representative imagery can comprise infrared images; whilst for use with images taken in the visible spectrum, the representative imagery can comprise images taken in the visible spectrum. In some cases, it may be possible to use images that are also representative of the subject of the images it is expected to apply the encoding method to. In other words, where it may be expected to use the encoding method to encode images taken in an urban environment, the representative imagery can be selected to be images of an urban environment.

2.7 Transform

A two dimensional discrete cosine transform (DCT) is applied to the filtered blocks. In the present example a two dimensional DCT-II is used, and the coefficients $B_{k_1,k_2}$ are accordingly computed as:

$$B_{k_1 k_2} = \sum_{n_1=0}^{M-1}\sum_{n_2=0}^{M-1} x_{n_1,n_2}\cos\left[\frac{\pi}{M}\left(n_1+\frac{1}{2}\right)k_1\right]\cos\left[\frac{\pi}{M}\left(n_2+\frac{1}{2}\right)k_2\right]$$

where $x_{n_1,n_2}$ is a coefficient at $n_1$, $n_2$ in the block of size M, and $k_1$, $k_2$ define the location of the coefficient $B_{k_1,k_2}$ in the transformed block.

The basis functions are cosine functions with varying wavenumbers $k_1$, $k_2$. Application of the transform enables the energy of the block to be compacted into only a few elements.

2.8 Implementation of Pre-filter and Transform

Calculation of the pre-filter and transform is the done in a single step using a lifting implementation, as described by Jie Liang et al. in 'Approximating the DCT with the lifting scheme: systematic design and applications', Conference Record of the Thirty-Fourth Asilomar Conference on Signals, Systems and Computers (Cat No. 00CH37154), 2000, pp. 192-196 vol. 1. The lifting implementation simplifies computation for both encoding, and for decoding, during which the inverse is applied. It has benefits for numerical resolution, and may also enable fully lossless operation.

Whilst the lifting implementation reduces the number of computations dramatically, computing the DCT and pre-filter remains a computationally demanding process. For example, a single High Definition (HD) image frame (1920×1080 pixels) requires around 32,400 calls to the DCT and lapped filter function. For a 640×480 pixel image, around 4,800 calls are required. Approximate versions of the DCT can be used, and these may enable a reduction in the number of numeric operations. It is believed that computational complexity can be reduced by up to 50% using such approximations. Such methods can also be adapted specifically for FPGA exploitation.

2.8 Block Ordering

The order in which the blocks are processed can be adapted in order to enhance the robustness of the codec. Enhanced robustness arises as a result of the order in which the prediction step is applied to the blocks, as is described in further detail below.

In the present example, the blocks are grouped into two interlocking sets. A first set comprises alternate blocks along each row of the image portion, and alternate blocks along each column of the image portion. A second set comprises the remainder of the blocks in the image portion. Thus the second set also comprises alternate blocks along each row of the image portion, and alternate blocks along each column of the image portion.

The two sets are schematically illustrated in FIG. 6. As can be seen, the first set 610 and the second set 620 each form a checkerboard pattern. The first set and the second set interlock, and together include all the blocks in the image portion.

Figure 7:
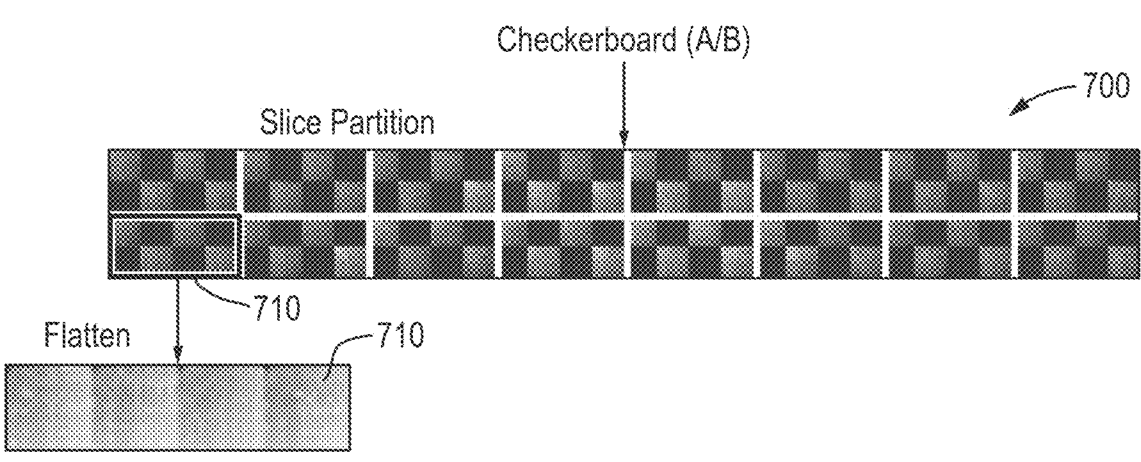
FIG. 7 is an illustration of the grouping of the transformed blocks of one set of FIG. 6 into slices in a step in a method according to an example of the invention.

For subsequent processing the first and second sets are further partitioned into slices, each slice comprising a number of blocks. FIG. 7 illustrates the partition into slices of a checkerboard pattern of blocks 700. By way of example the slices in FIG. 7 each have four blocks. Slice 710 is highlighted. Conceptually, the slice is flattened such that the blocks are adjacent to each other as illustrated. Larger slices result in better rate-distortion performance, whereas smaller slices better support resilience of the encoded image.

2.9 Prediction

For the prediction step, each block is further divided into a zero frequency, DC coefficient, and one or more sub-bands of non-zero frequency AC coefficients. The number of sub-bands will depend on the size of the block. In the case of a four by four block, only one sub-band is defined. For larger block sizes, a larger number of sub-bands are defined, with separate sub-bands for the horizontal, vertical, and diagonal high frequency components.

Figure 8:
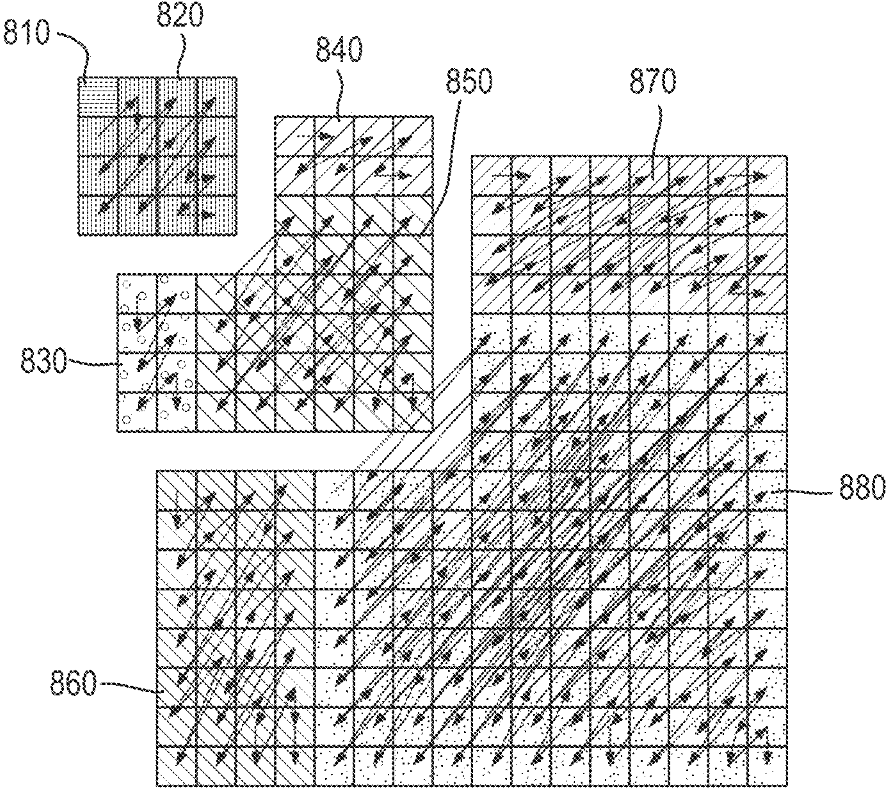
FIG. 8 is an illustration of how the coefficients in image blocks of different sizes can be scanned into a particular order in a step in a method according to an example of the invention.

FIG. 8 schematically illustrates how the sub-bands are defined for block sizes of four by four, eight by eight, and sixteen by sixteen. For each block size there is a single DC coefficient 810. As depicted, the AC coefficients relate to progressively higher frequency components on moving from the top to the bottom of the block (higher vertical spatial frequencies), or from the left to the right of the block (higher horizontal spatial frequencies). For a four by four block, the remaining AC coefficients are processed as one sub-band 820.

For an eight by eight block, three additional sub-bands 830, 840, and 850 are defined. Sub-band 830 comprises a four by two group of coefficients of higher vertical spatial frequency, but lower horizontal spatial frequency, and is immediately below sub-band 820. Sub-band 840 comprises a four by two group of coefficients of higher horizontal spatial frequency, but lower vertical spatial frequency, and is immediately to the right of sub-band 820. The remaining coefficients of an eight by eight block define sub-band 850.

For a sixteen by sixteen block, a further three sub-bands 860, 870, and 880 are defined, in addition to those defined for the eight by eight block. Sub-band 860 comprises an eight by four group of coefficients of higher vertical spatial frequency, but lower horizontal spatial frequency, and is immediately below sub-band 830. Sub-band 870 comprises an eight by four group of coefficients of higher horizontal spatial frequency, but lower vertical spatial frequency, and is immediately to the right of sub-band 840. The remaining coefficients of a sixteen by sixteen block define sub-band 880.

In some encoding modes, suitable for very low bit rate environments, the AC coefficients may be completely neglected, and only the DC coefficients processed and transmitted. Such a DC-only mode can still provide useful image data, and offers maximum resilience since (as is described in further detail below) all DC coefficients are fixed length after quantisation. A DC-only mode may be selected, for example, when a fixed size is selected for either the overall image or for selected individual image portions, and it is apparent that the remaining capacity within the fixed limit is insufficient to allow encoding of the AC coefficients.

In the present embodiment, prediction is performed at the slice level. Thus, each slice includes one reference block and a number of predictions. The predictions are determined in a different manner for the DC and AC coefficients, as is described below.

2.9.1 DC Prediction

Figure 9:
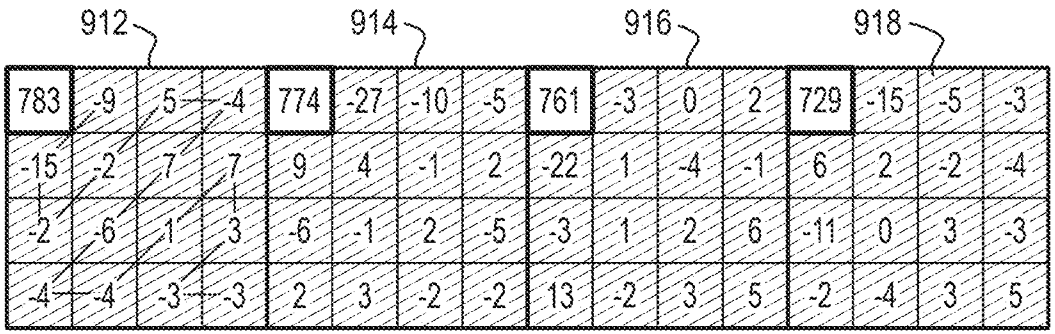
FIG. 9 is an illustration of the coefficients in one of the slices of FIG. 7.
Figure 10:
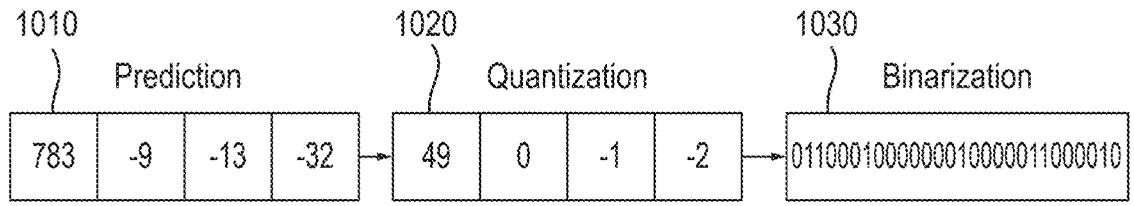
FIG. 10 is an illustration to show how the zero frequency coefficients are predicted, quantised and converted to binary code in a step in a method according to an example of the invention.

DC prediction in the present example is performed for blocks within a single slice. FIG. 9 illustrates the DC coefficients and first sub-band for blocks 912, 914, 916, and 918. The DC coefficient for the first block in the slice is taken as a reference coefficient. Each subsequent DC coefficient is predicted, from the reference coefficient, as the difference between the current DC coefficient and the preceding DC coefficient. Thus, as shown in FIG. 10, the DC coefficients in blocks 912, 914, 916, and 918 are:

| 783 | 774 | 761 | 729 |
|---|---|---|---|

and the prediction process, as illustrated at 1010 accordingly compacts these values to

| 783 | −9 | −13 | −32 |
|---|---|---|---|

As will be seen, the actual values of the coefficients can then be recomputed at the decoder by adding the predictions −9, −13, and −32 successively to the reference coefficient. It is possible (and typical) to predict DC coefficients across a larger number of blocks. For example, in many known image codecs DC coefficients are predicted from a single reference coefficient for a whole image. However it will be seen that a single error in the transmission of the DC coefficients would then propagate across the whole remainder of the image. By constraining the prediction to a smaller number of blocks some compaction is retained whilst confining any errors to a single slice. The consequences of an error within a single slice are further reduced by the checkerboard structure of each slice, since error concealment algorithms used in the decoding process are able to make use of neighbouring blocks if a transmission error results in complete loss of a slice.

2.9.2 AC Prediction

Prediction of the AC coefficients is performed for blocks within a single slice, and at the sub-band level. The coefficients in each sub-band are first vectorised. The vectorisation process converts the two dimensional block of coefficients into a string of coefficients. The coefficients are placed in the string in a predefined order. The scanning pattern is arranged such that the resulting string of coefficients is, broadly speaking, ordered from low frequency components to high frequency components. Typically the coefficients are highly correlated when ordered from low frequency to high frequency. A number of scanning patterns can be defined to capture the coefficients in a suitable order. In the present example a zig-zag scanning pattern, illustrated in FIG. 8 for each of the sub-bands in exemplary block sizes four by four, eight by eight, and sixteen by sixteen, is used.

By way of specific example, for the four by four block 912 illustrated in FIG. 9, the zig-zag order is illustrated by an arrow. In that case the fifteen AC coefficients would be ordered in a vector (as illustrated at 1110 in FIG. 11 described below):

−9, −15, −2, −2, 5, −4, 7, −6, −4, −4, 1, 7, 3, −3, −3

A vectorised sub-band for a particular block is predicted on the basis of the sub-band from the previous block, making use of the likely similarity between the two sub-bands. The prediction method used in the present example follows the method disclosed by Valin and Terriberry in 'Perceptual Vector Quantization for Video Coding', available at https://arxiv_org/pdf/1602.05209_pdf. Briefly, the vector spaced is transformed using a Householder reflection. If $x_{n-1}$ is a vector defined by the AC coefficients, ordered as above, from either the reference sub-band or the previous sub-band, then the Householder reflection is defined by a vector v normal to the reflection plane:

$$v = \frac{x_{n-1}}{\|x_{n-1}\|_2} + se_m$$

where $e_m$ is a unit vector along axis m and s is the sign of the mth element in $x_{n-1}$. Axis m is selected as the largest component in $x_{n-1}$ to minimise numerical error. The input vector $x_n$ is reflected using v as follows:

$$z = x_n - 2\frac{V^T X_n}{v^T v} v$$

The prediction step describes how well the reflected input vector z matches the reflected $x_{n-1}$, which, once transformed, lies along axis m. An angle θ can be calculated to describe how well $x_n$ matches the prediction. It is calculated as:

$$\cos\theta = \frac{x_n^T r}{\|x_n\|_2 \|r\|_2}$$

in which r is the vector of prediction coefficients. For the first prediction in a slice, r is equivalent to $x_{n-1}$. For decoding, z is recovered using the following formulation:

$$z = \gamma(\cos\theta e_m + \sin\theta u)$$

where γ is the gain (L2-norm) of $x_n$, and u is a unit length vector relating the reflected $x_n$ to axis m. The quantities γ, θ, and u are subsequently quantised and encoded for transmission as described below. The above operations can then be reversed to recover $x_n$ from z, and the block reconstructed using the ordering defined by the zig-zag scanning process, which is known to the decoder. In the context of vector quantisation, described further below, this prediction technique has the benefit that resolution is increased around the values in the previous sub-band. In other words, the quantisation scheme will quantise those vectors close to the preceding sub-band vector coarsely than those vectors lying further away from the preceding sub-band.

2.10 Quantisation

Different quantisation approaches are applied for the DC and AC coefficients obtained from the DCT algorithm.

2.10.1 DC quantisation

For the zero frequency DC coefficients, a fixed-length binary string is used for both reference and prediction coefficients is used. The string can be made longer for a finer quantisation level, or shorter for a more course quantisation level. The length of the string can vary between different image portions to enable different image portions to be encoded at different resolution levels. Each coefficient is represented by a binary string of the same length, and it is possible for a shorter length to be used for the prediction coefficients than for the reference coefficients. In the present example, as illustrated in FIG. 10 at 1030, a seven bit fixed length string is used for both reference and prediction coefficients. This enhances the robustness for the algorithm since the fixed length string supports resynchronisation if an error occurs during transmission of the encoded image.

2.10.2 AC Quantisation

As described above, the AC coefficients are captured in vectors. Vector quantisation techniques are therefore appropriate for quantisation of the AC coefficients. More particularly, in the present example, gain shape vector quantisation (GSVQ) is used to quantise z as defined in 2.8.2 above. GSVQ works by separating a vector into a length and a direction. The gain (length) is a scalar that represents the energy in the vector, while the shape (direction) is a unit-norm vector which represents how that energy is distributed into the vector.

The scalar gain value γ is quantised using a uniform quantiser. For predicted sub-bands, the angle θ is also quantised using a uniform quantiser. The shape, or direction, u, is quantised using a codebook having L−1 dimensions and being parametrised by an integer K. Here L is the number of AC coefficients in the relevant sub-band. The codebook is created by listing all vectors having integer components which sum to K. It will be understood that the number of dimensions can be L−1 because the sum of the components is known. Each vector in the codebook is normalised to unit length to ensure that any value of K is valid. As the number of dimensions is fixed, the parameter K determines the quantisation resolution of the codebook. Notably, as γ increases, the quantisation resolution for a fixed K will decrease. In some examples, therefore, it may be possible to adapt K based on the computed γ, increasing with increasing gain so as to retain quantisation resolution. K can also vary between different image portions, as with the DC quantisation, to enable different image portions to be encoded with different resolutions.

Figure 11:
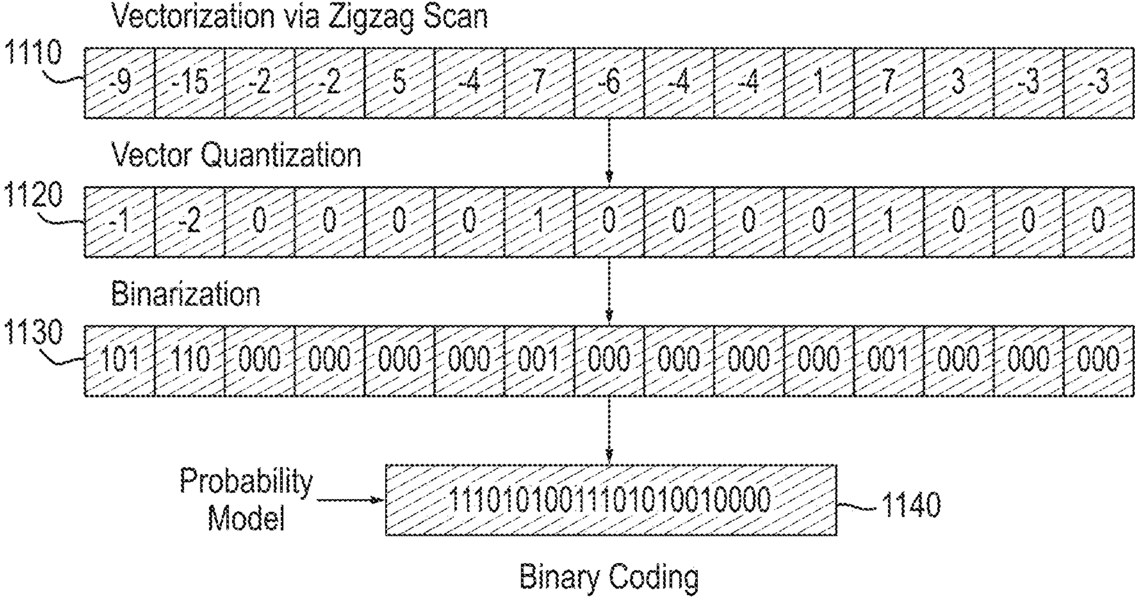
FIG. 11 is an illustration to show how the higher frequency coefficients are predicted, quantised and converted to binary code in a step in a method according to an example of the invention.

An example of this process is illustrated in FIG. 11. Block 912 (illustrated in FIG. 9) is converted to a vector 1110 using the zig-zag scan described above. After quantisation, the vector 1110 is transformed to a vector 1120. Vector 1120 has the same number of coefficients as vector 1110, but its coefficients are lower valued, and many are quantised to zero. Subsequently, the coefficients are binarised using a fixed length coding method, resulting in the string 1130, with three bits encoding each coefficient. Blocks 914 to 918 are similarly processed, with an additional prediction step performed on the basis of the previous block. The use of fixed length coding at this stage facilitates resynchronisation at the decoder in the event of errors occurring in transmission.

2.11 Coding

Processing as described above results in a series of strings of binary data. For each slice of four blocks, one string represents the DC coefficients, predicted and quantised as described above. There are additional strings for each sub band stack in the slice, the sub band stack being the sub band coefficients for each block in the slice concatenated together. Thus one string represents each of the sub-band stacks of AC coefficients, predicted and quantised as described above, and concatenated for the blocks each slice. Where there are three sub-bands in a block, therefore, each slice will contain three sub-band stacks which will accordingly be represented by three strings. Where there is only one sub-band in a block, each slice will contain only one sub-band stack which will accordingly be represented by one string. Each sub-band stack of AC coefficients is further encoded using a binary arithmetic coding technique. For example, M-coder, disclosed by D. Marpe in "A Fast Renormalization Technique for H.264/MPEG4-AVC Arithmetic Coding," in 51st Intenationales Wissenschaftliches Kolloquium, Ilmenau, 2006 can be used. Various other known binary arithmetic coding techniques may also be used.

The binary arithmetic coding scheme makes use of a probability model, which provides for more likely syntax elements in the various strings to be assigned shorter codewords. In the present example, since it can be assumed that the type of imagery to be encoded is known, representative data is used to tailor the probability model. This results in higher compression ratios than would be obtained were the prior known (contextual) approach to be used. Because the sum of each vector of AC coefficients is restricted to be K as a result of the vector quantisation process, the range of possible values is restricted. Based on a weak invocation of the central limit theorem, the probability of each element is then approximated by a truncated normal distribution with zero mean:

$$p(x_i) \sim N_{-K:K}(0, \sigma)$$

The present inventors have identified that the variance $\sigma$ of this distribution is influenced by vector length L, vector sum K and the position in the vector i. A three-parameter model is used to capture this relationship:

$$\sigma = \alpha\left(\frac{K}{L-i+1} - \frac{K}{L}\right) + K\sigma_0 + \beta$$

Parameters $\hat{\alpha}$, $\hat{\beta}$, $\hat{\sigma_0}$ were estimated using a least-squares optimiser. In the present example, values for these parameters were computed for medium wave infrared imagery. By way of example, for the first sub-band within a reference four by four block, the values were calculated to be $\hat{\alpha}=1.0987$, $\hat{\beta}=0.8871$, $\hat{\sigma_0}=0.0695$. These coefficients are calculated separately for reference and predictions sub-bands. As will be appreciated, each imaging modality will have a different set of optimal values for these parameters.

The variable length coding scheme is further modified using a bit stuffing scheme, as disclosed by H. Morita, "Design and Analysis of Synchronizable Error-Resilient Arithmetic Codes," in GLOBECOM, 2009. In broad terms, the scheme allows only k−1 consecutive 1s in the bit stream during encoding. If this rule is breached, a 0 is inserted. An End of Slice (EOS) word of k 1s is used to denote the end of the slice for each sub-band. This ensures the EOS code only occur at the end of the slice in nominal conditions with no errors. The bit-stuffing scheme further enhances robustness of the coding as it facilitates resynchronisation in the event of an error during transmission.

The variable length coding compresses the information required to code the AC coefficients in each sub-band, but results in strings of different length for each sub-band. This can lead to a loss of synchronisation when decoding in the event of a bit error occurring as a result of transmission. Whilst it is possible to add further codewords to enable resynchronisation, their remains the problem that if these words are corrupted, there will remain the potential to lose synchronisation with consequential and potentially significant errors arising in the decoded image. In the present example, therefore, an allocation method is used to convert the variable length bins into bins of consistent length. The allocation method used in the present example is based on the error-resilient entropy code (EREC) method. This method is disclosed by D. W. Redmill and N. G. Kingsbury in "The EREC: an error-resilient technique for coding variable length blocks of data", IEEE Transactions on Image Processing, vol. 5, no. 4, pp 565-574, April 1996; a faster method being disclosed by R. Chandramouli, N. Rangahathan, and S. J. Ramados in "Adaptive quantization and fast error-resilient entropy coding for image transmission", IEEE Transactions on Circuits and Systems for Video Technology, vol. 8, no. 4, pp 411-421, August 1998.

In broad terms, the EREC methods in the above-referenced disclosures apply a bin packing scheme to convert bins of variable length for each block in an image into fixed length bins, moving bits from relatively longer bins into relatively shorter bins. A defined search strategy is used to identify the relatively shorter bins so that they are filled in an order that can be known to the decoder. Since the bin length can be fixed, it does not need to be provided to the decoder in transmission, and there is no need to include further synchronisation words. The decoder can unpack the fixed length bins using knowledge of the search strategy, bin length, and an end of block code. The EREC has the additional benefit that errors are more likely to occur at higher spatial frequencies, where errors are likely to be easier to detect and conceal.

Figure 12:
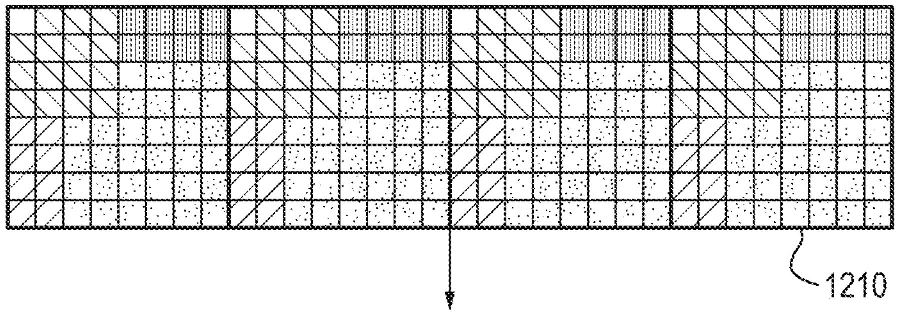
FIGS. 12 and 13 are flow diagrams illustrating further steps in the conversion of the coefficients to binary code in steps according to an example of the invention.
Figure 12:
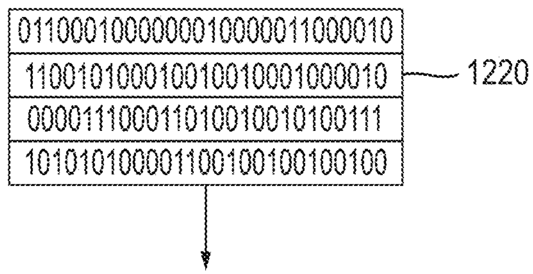
Figure 12:
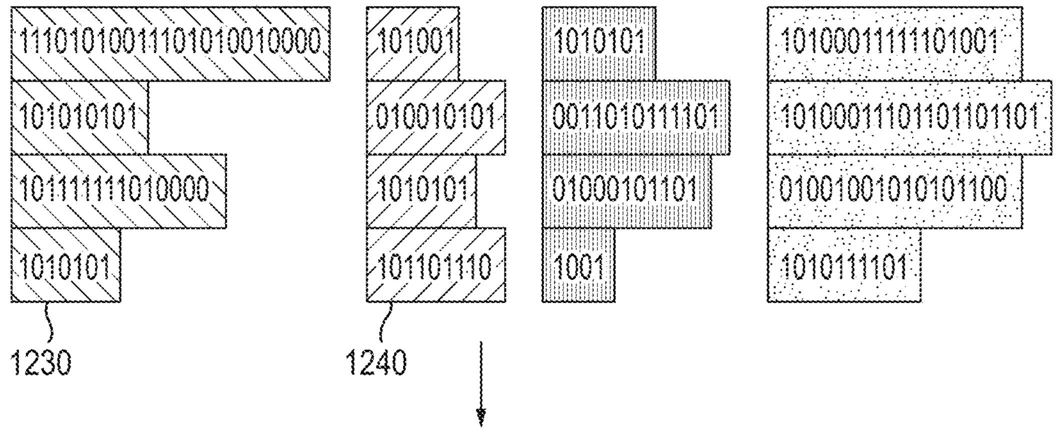
Figure 12:
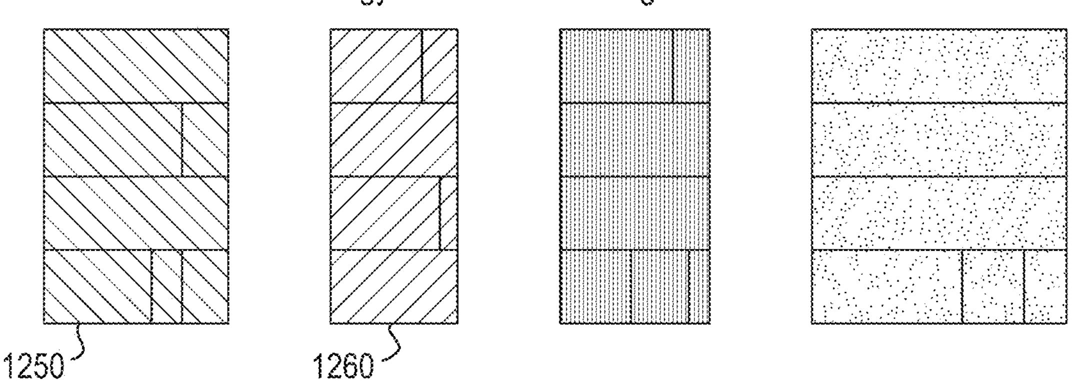

As schematically illustrated in FIG. 12, an exemplary slice 1210 of four eight by eight blocks comprises four DC coefficients, and four sub-bands of AC coefficients for each block. As described above, the DC coefficients are of fixed length as schematically illustrated at 1220. The AC coefficients for each sub-band are illustrated schematically as being stacked at 1230, 1240. Because of the variable length coding, the strings for the AC coefficients in each sub-band stack are of variable length. An allocation method based on the EREC method is applied to each sub-band stack in each slice, resulting in uniform length bins (such as 1250, 1260) for each sub-band in the slice. In contrast the EREC method in the above disclosures is applied at the block level.

Sub-band stack 1230 comprises strings representing the lower frequency AC coefficients for each of the blocks in the slice 1210, arising from sub-bands 1211 in a first block, 1212 in a second block, 1213 in a third block, and 1214 in a fourth block. After variable length coding there are four strings, 1231, 1232, 1233, and 1234 respectively, representing these coefficients, each string having a different number of bits. Four bins of uniform size are defined, such that the four bins in combination have sufficient space to hold all the bits of strings 1231, 1232, 1233, and 1234. The bits representing the sub-band stack are then allocated to the bins. Each bin has an associated block, and the bits in that bin start with the bits for the relevant sub-band of its associated block. If the number of bits in the relevant sub-band of its associated block is greater than the uniform size, the allocation method interrogates the next bins sequentially to determine if there is space for the excess bits.

For example, in the case of the bits representing the sub-band stack comprising the sub-bands for the lower frequency AC coefficients in a slice, if the string 1231, which represents the coefficients of the lower frequency AC coefficients in the first block, is longer than the uniform size, the allocation will first interrogate the bin associated with the second block to determine if there is space for the excess bits. If there is space, the excess bits are placed in that bin. This step is repeated for each of the strings 1231, 1232, 1233, and 1234.

Thus, if there are excess bits in string 1232, the allocation method will interrogate the bin associated with the third block, and so on for strings 1233 and 1234 (the bin associated with the first block being interrogated in the case that there are excess bits in string 1234). If there remain excess bits once this step has completed, the allocation method repeats the step, but instead of interrogating the bin associated with the subsequent block, it interrogates the bin associated with the next-but-one block. The step is repeated, interrogating sequentially later blocks, until all the bits are allocated to one of the bins.

The bins are thus filled firstly with bits representing the relevant sub-band of their associated blocks, and then, in a sequential order, excess bits from the relevant sub-bands of other blocks in the slice. The decoder can unpack the fixed length bins using knowledge of the search strategy, bin length, and the EOS word of k 1s that is inserted at the end of each sub-band in the slice.

It will be noted that the bins for different sub-bands may have different (fixed) lengths. This implementation enables the length of the slice to become a parameter, which may for example be defined for each image portion, and which enables resilience to be traded with bandwidth and computation time. Smaller length slices are more resilient, but require larger bandwidth, and longer computation times.

In some examples, early stopping criteria are applied to the EREC bin packing. Because of the complexity of the processing, it is possible for many iterations to be run without finding an exact packing. By terminating after a certain number of iterations, in both bin-packing during encoding and unpacking during decoding, a suitable packing (or unpacking) can be arrived at, without significant error, whilst ensuring that the processing terminates within a reasonable time.

Figure 13:
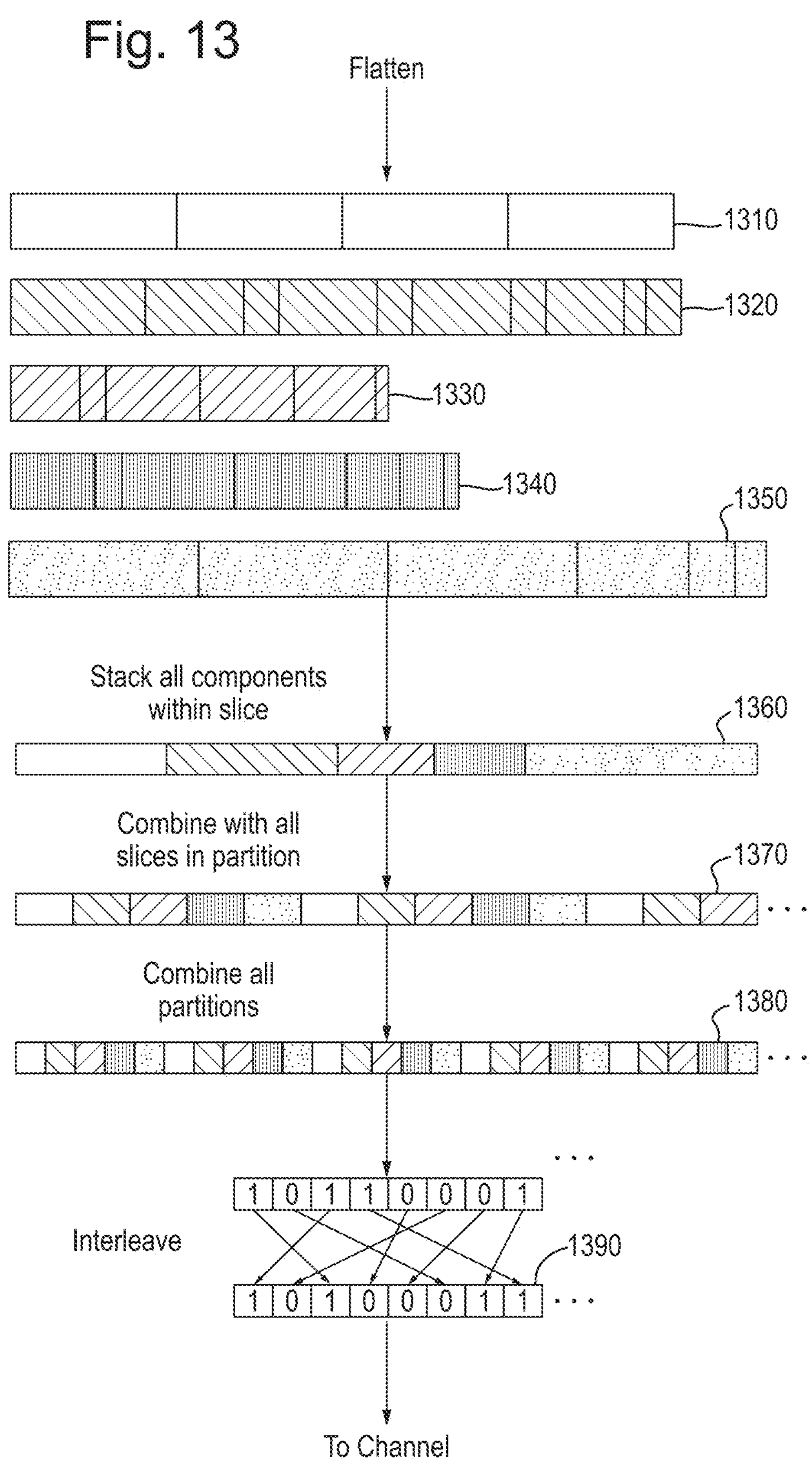

A bit stream is then created by concatenating the uniform length bins in successive steps, as is illustrated in FIG. 13. In a first step, the uniform length bins for each sub band are conceptually flattened together, resulting in separate strings 1310, 1320, 1330, 1340, and 1350 for the DC coefficients, and for each sub-band in a slice. The separate strings are then concatenated for each slice, resulting in a string 1360 containing all the information for one slice. All slices within a set of blocks are combined as illustrated at 1370, and then the sets for an image portion are combined as illustrated at 1380. The concatenation steps are performed in order to preserve the identity of each set, slice, sub-band and block. The image portion header, including the size of the image portion in terms of number of bits, is added to the concatenated bitstream for the image portion. Each of the image portions is processed as described. The image portions can then be interleaved, encrypted, and transmitted independently, or, as in the present example, the bitstreams for each of the image portions are concatenated, and the resulting bitstream, which encodes the whole of the image, is interleaved and encrypted, as illustrated schematically at 1390 and described below.

2.12 Interleave

Prior to transmission, the binary stream from the encoder is split into data packets. Whilst this can be done by simply splitting the stream into components of the appropriate packet size, in the present embodiment an interleaver is used. The interleaver selects which bits are integrated into which data packet. This can be done in an ordered manner, or at random, with a key provided to the decoder so that the received packets can be re-ordered so as to be able to re-construct the image. The interleaver has the effect that, should packet losses or burst errors occur, the errors in the re-ordered binary stream will be distributed throughout the image, rather than concentrated in any one area. Distributed errors can be easier to conceal. In the present embodiment, as described above, the bitstreams created for each of the image portions are concatenated together prior to interleaving, so that any errors are distributed across the entire image, rather than across only one image portion.

Figure 14:
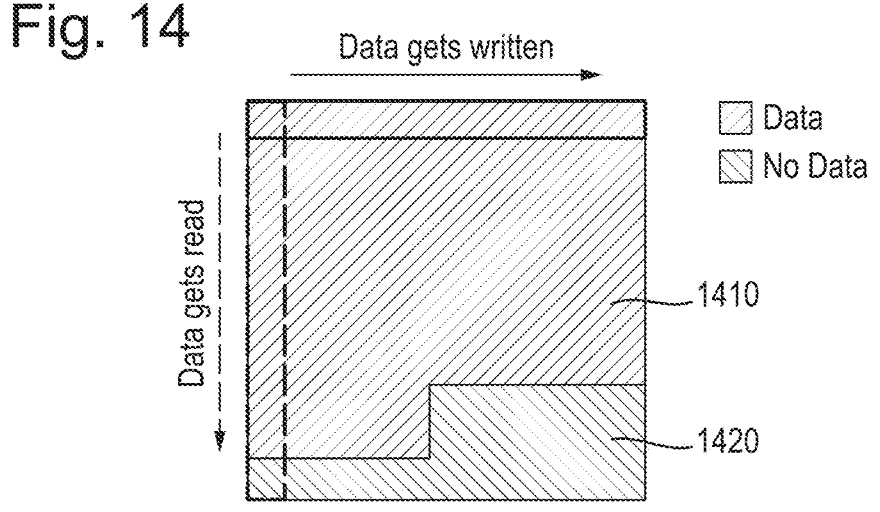
FIG. 14 schematically illustrates a part of an interleaving process according to a step in a method according to an example of the invention.

In the present embodiment a block interleaver is used. The block interleaver writes data into a section of allocated memory row-wise, and then reads data from the memory column-wise into packets for transmission. This distributes neighbouring bits across different packets. The number of rows in the allocated memory is selected to be the size of the data packet. The number of columns is selected to be the maximum number of packets required to encode an entire image. This is illustrated in FIG. 14, in which the memory allocation is shown schematically with cells 1410 containing data, and cells 1420 that do not. After interleaving, therefore, some data packets contain null information at the end of the binary stream. The null information enhances the resilience of the encoded data, since it has no effect on performance if it becomes corrupted. In alternative embodiments it may be possible to base the memory allocation size on the actual encoded length, rather than using a fixed size, thereby reducing the amount of data required to encode an image.

As each data packet is read from the block interleaver, it is assigned a header containing the frame number and packet number. The packet can then be transmitted.

Typically interleaving is performed in a separate dedicated transmission apparatus. In the present example, however, the interleaving is performed as an integral part of the encoding of the image. As has been described above, where it is desired to encrypt the image, the encryption can also be performed as an integral part of the encoding of the image. Thus, the encoded image file can, for example, be stored on a computer-readable medium after the interleaving and encryption has been performed. The encoded image file can be passed to a separate dedicated transmission apparatus, with interleaving and encryption already performed, so that the dedicated transmission apparatus need not perform either interleaving or encryption prior to transmitting the image. This has the benefit that the dedicated transmission apparatus does not need to read through the encoded image data in order to perform interleaving or encryption prior to transmitting the data packets. Thus including the interleaving step in the encoding process reduces latency in transmission, as well as providing additional resilience, particularly to burst errors.

2.13 Encryption

In some circumstances it can be desirable for the image data to be encrypted prior to transmission. Encryption reduces the potential for unauthorised third parties to gain access to the image during transmission. A number of encryption methods are well-known and can be used in the present method. One example method is the Advanced Encryption Standard (AES). In the present example AES 256 is used and applied after interleaving. The use of encryption reduces the resilience of the encoded image to data loss, because the loss of only one bit from an array of 16 encrypted bytes results in the entire 16 byte array being unrecoverable. However the enhanced resilience resulting from other steps applied in the codec still ensures that images encoded using the present method are significantly more resilient than those encoded using currently known image codecs, even when encryption is applied.

The encryption algorithm is included as an integral part of the image encoding. Where AES 256 is applied, the size of the data packets is selected to be a multiple of the encryption array size of 16 bytes. Because the packet size is chosen to be optimal for the encryption, it is ensured that no additional padding is required. Were, for example, the packet size to be selected to be 300 bytes, additional padding with null information would be required to make the packet size divisible by 16 bytes, since this is a requirement of AES 256. Thus encryption efficiency is increased.

2.14 Decoder

The transmitted packets are received at a decoder and, in broad terms, can be processed by reversing the steps described above so as to reconstruct the image transmitted, as described above in Section 1 with reference to FIG. 1B. Some steps are taken by the decoder to increase robustness, and some steps are taken to identify errors that may have occurred during transmission. Some steps are also taken by the decoder to conceal any errors that have occurred.

When a packet is received at the decoder, and subsequent to any necessary decryption, the frame number and packet number are read from the header. If the frame number is greater than then previous packet, then the binary stream is read out of the block interleaver and the decoder runs to produce an image. If the frame number is the same as the previous packet, then the packet number is read and the payload contained within the packet is written into the block interleaver based on the packet number. If the frame number is less than the previous packet, then the packet is discarded.

The decoder is able to decode the binary stream using parameters provided to it in the image header and other predetermined factors that can be pre-programmed in the decoder, such as the inverse of the allocation method used to allocate bits to a position in the bit stream. Since the binary stream arises from a number of strings that are concatenated together in a predetermined order, each slice, and the bits representing its zero frequency coefficients for each block, and the sub band stacks, can be identified from the binary stream. Within the slice, the position of bits for particular sub-bands of particular blocks is determined by the allocation method described above.

Similarly, separate image portions can be identified from the image header, and individual image portion headers. The separate image portions can be decoded independently, for example using a multithreaded implementation, similar to the implementation described above in relation to the encoding method.

The decoder can identify a bit stream relating to each sub band in each block by locating the end of slice code word and inverting the steps of the allocation method. For example, to separate the bits relating to a sub-band of each block in a slice, the decoder first identifies each of the bins in the bit stream for the slice. Each bin has an associated block in the slice. The decoder can then read the start of each bin in the slice. If the decoder reads an end of slice code word a bin, the bits read to that point relate to the complete sub band for the block associated with that bin.

If it does not read an end of slice code word in a first of the bins, which first of the bins is associated with a first block, it moves to read a second, subsequent bin to determine whether an end of slice word is present. If it identifies an end of slice code word in the second bin, the bits immediately following the end of slice code word relate to the remainder of the bits for the sub band of the first block. If it identifies a further end slice code word in the second bin, then the bits for the sub band of the first block are complete. If the decoder does not identify a further end of slice code word in the second bin, it moves to the subsequent, third bin, where it will need to identify two end of slice code words before reading bits relating to the remainder of the sub-band of the first block. This process can repeat until the sub-band is complete for all of the blocks in the slice.

In some examples the predicted DC coefficients can be capped. Typically, the changes in the actual DC coefficients from block to block will be relatively small, and a relatively large change can be indicative on an error or (in the decoder) corruption occurring during transmission. Imposing a cap on the value of the predicted DC coefficients, constraining their values to be within a certain range, can reduce the resulting errors in the decoded image.

In the exemplary case above for blocks 912, 914, 916, and 918, a fixed cap for the predicted coefficients of ±50 may be appropriate. Such a fixed cap, in this example, would not affect the true values of the predicted coefficients but would remove large errors that may occur in transmission. For example, were the predicted coefficient −9 for block 914 to be corrupted to −999, in the absence of a cap, an error of 990 would be present in block 914, and would propagate through blocks 916 and 918. A fixed cap of ±50 would reduce the error to 41, and result in a lower amount of distortion in the final decoded image.

The cap need not be fixed. For example, the cap may vary dynamically between blocks, slices, or image portions. It may be defined as a percentage of the reference block DC coefficient; or alternatively as a percentage of the reference block DC coefficient but with a set minimum value. A set minimum value avoids the potential for a percentage cap to be too small if the reference DC coefficient is small. In an alternative to the use of capping, in some examples it may be appropriate for the decoder to reject values for DC coefficients that fall outside a certain range. Pixels with rejected DC values can be left blank; replaced with an estimate based on neighbouring pixel values; or, if the image is part of a series of frames in a video, replaced with the corresponding value from the previous frame.

The decoder implements a check to determine that the coefficients of the reconstructed block add up to K. The decoder can identify the value of K from the header information. The encoding mode specified in the image header may specify the value of K; or the value of K may be specified in each image portion header, as would be appropriate if the quantisation level is to vary between image portions. If the coefficients do not add up to K, as will be understood from the above, it is apparent that an error must have occurred. The error may in some examples be corrected by simply adding or subtracting the appropriate value from the maximum coefficient so as to ensure that the overall sum does add to K. Alternatively or in addition the error can then be signalled to an error concealment module of the decoder, described below.

Once the coefficients have been determined by the decoder, the image data can be reconstructed by performing an inverse of the discrete cosine transform described above, and applying a post filter to invert the pre-filter described above. In the present example an error concealment method based on a persymmetric structure of optimal Wiener filters is used to conceal any identified errors. This method is able to isolate errors that have been identified and prevent their propagation to neighbouring blocks. Effectively, an identified corrupted block can be interpolated using the Wiener filter.

Errors can be identified using known methods to detect visual artefacts in the decoded image. Errors can also be identified using information obtained from the decoding process. Such information may include sum-checking during the reconstruction of vectors in the reverse GSVQ process; or from the bit-stuffing scheme applied during coding. Where the image is part of a series of frames of video footage, it will be possible to use information from a previous frame to replace information lost as a result of transmission errors in the current frame, rather than using the interpolation method above.

3. Performance

The performance of the codec has been analysed for resilience against bit errors occurring during transmission, and compared to the performance of known image codecs with the same bit error rates. Bit error rates have been simulated through the random flipping of bits.

Figure 15:
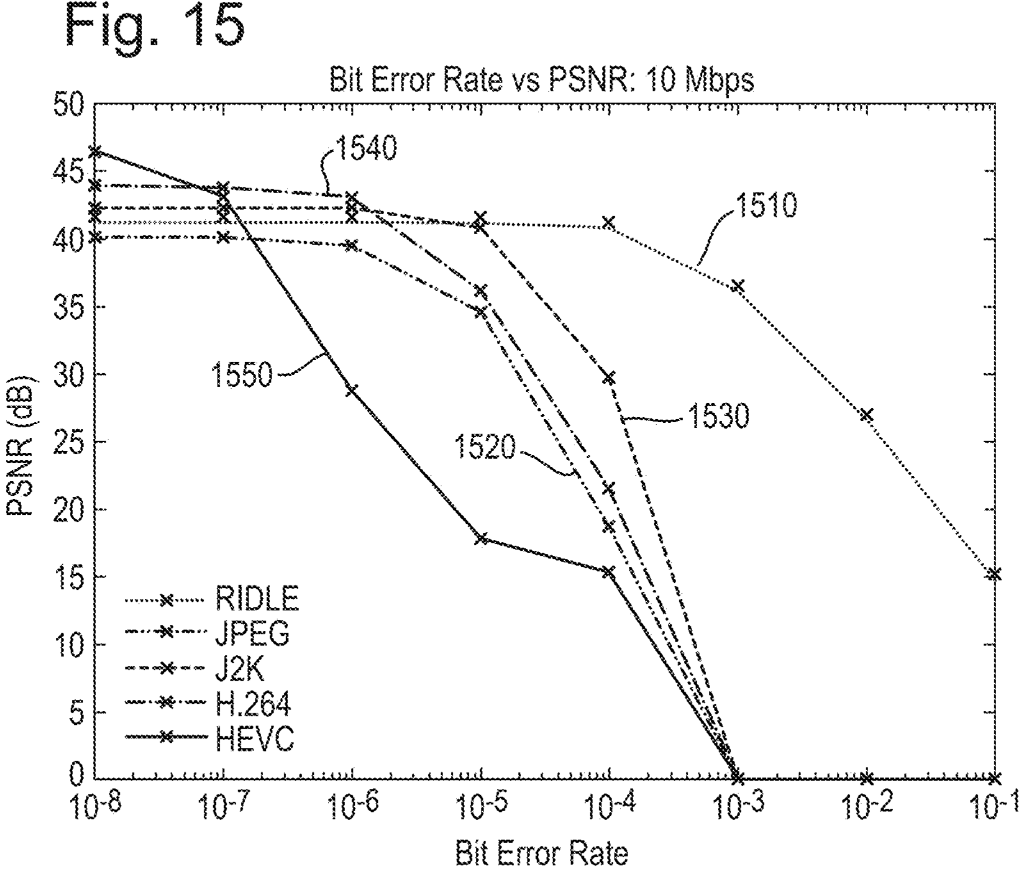
FIG. 15 is a graph comparing the performance of an example method according to the invention with the performance of known methods for encoding images.
Figure 16:
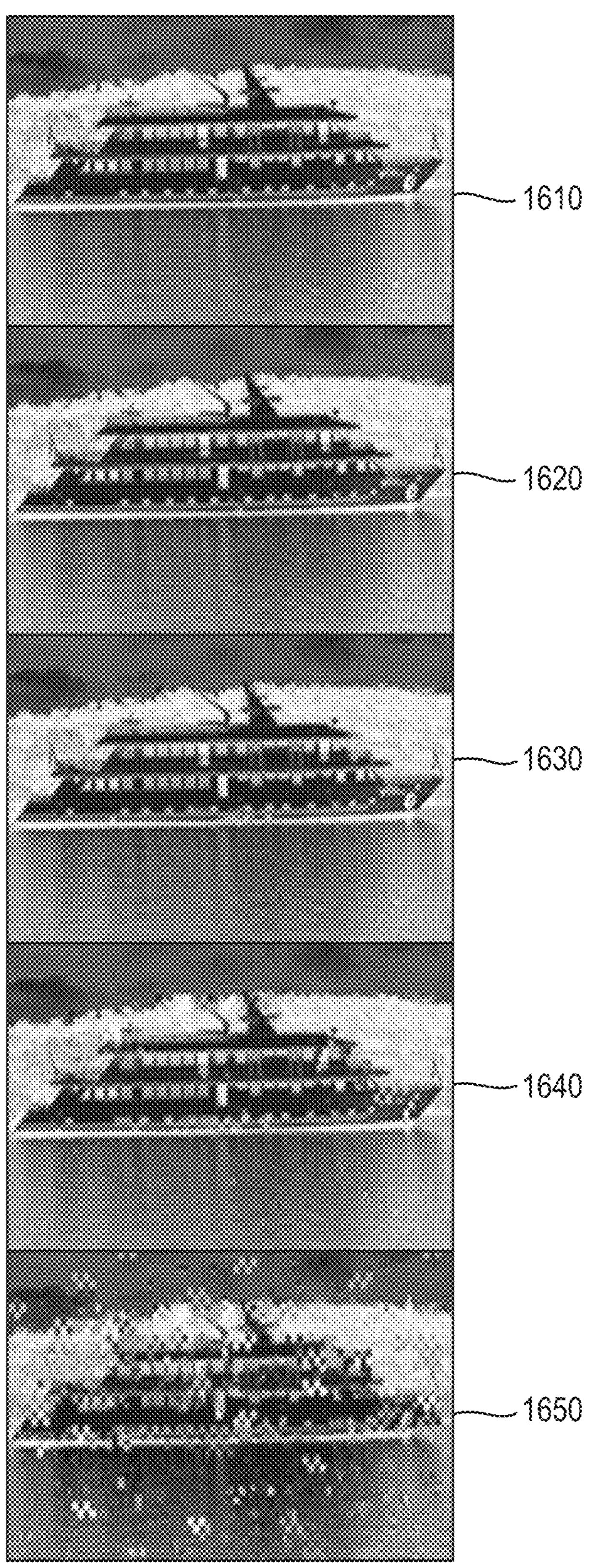
FIG. 16 shows an image encoded using a method according to an example of the present invention after reconstruction following transmission subject to varying bit error rates.

FIG. 15 is a graph illustrating the variation of decoded image quality, described by peak signal-to-nose-ratio (PSNR), with bit error rate, for an example of the present invention, illustrated by line 1510, and current image codecs JPEG, JPEG2000 (J2K), H.264 and HEVC, illustrated by lines 1520, 1530, 1540, and 1550 respectively. For the current codecs, the versions most resilient to bit error rate were selected for comparison. It can be seen that the examples of the present invention have lower image quality at low or zero bit error rates than most current codecs, but that image quality is maintained for significantly higher bit error rates than for all current image codecs. All the current image codecs shown suffer catastrophic image loss for bit error rates of $10^{-3}$. The HEVC codec shows significant reduction in quality even for bit error rates of $10^{-6}$. By contrast, line 1510, illustrating the performance of an example of the present invention, shows almost no reduction in PSNR for bit error rates of up to $10^{-3}$, a relatively slow loss of quality thereafter, and useful information still obtained at a bit error rate of $10^{-1}$. In other words, examples of the present invention enable useful image data to be communicated via a transmission channel in which one bit of every ten is lost or corrupted. FIG. 16 further illustrates the robustness of an example codec to bit errors. FIG. 16 shows a number of actual images, coded using an example codec and decoded after simulated corruption of data. Image 1610 illustrates the image with bit error rate of $10^{-6}$. Image 1620 illustrates the image with a bit error rate of $10^{-5}$. Image 1630 illustrates the image with a bit error rate of $10^{-4}$. Image 1640 illustrates the image with a bit error rate of $10^{-3}$. Image 1650 illustrates the image with a bit error rate of $10^{-2}$. Even at the highest bit error rate, useable information can still be obtained, particularly if the image is part of a stream of frames of the same scene. No loss of usefulness is seen at a bit error rate of $10^{-3}$, with image problems that may impair algorithms such as target detection algorithms only occurring at bit error rates of $10^{-2}$ or higher. It will be noted that current image codecs such as H.264 suffer catastrophic loss at a bit error rate of $10^{-4}$.

4. Implementation Details

In order to implement the codec, various selections have been made to support rapid processing speed. For example, lookup tables are used to emulate floating point operations such as computation of exponentials or cosines. Integer approximations or integer scaling are used where lookup tables would be unfeasible because of size. Integer approximations are expected to be most beneficial because they minimise complexity with only a small reduction in precision. This is done, for example, in the implementation of the lapped filter and discrete cosine transform using the lifting process described above. Integer scaling is used for other calculations, such as computation of square roots or the vector norm.

A number of fixed and repeatable operations are stored within lookup tables, including quantisation tables, the scanning order of coefficients, lapped filters, fixed length codewords, and DCT parameters. Some operations that could be stored within lookup tables, such as the probability model for arithmetic coding and the vector quantisation function, are currently computed outside of lookup tables because of the memory requirement, but could be implemented as lookup tables in future implementations.

As has been noted in the above, the various parameters of the encoding and decoding can be configured for particular applications or uses of the encoding and decoding method. Different parameters can be selected to enhance resilience of the encoded data to transmission errors, or to enhance the amount of compression applied to an input image, or to enhance image quality. The configurable parameters can include: the factor by which an input image is downsampled; the number of bits used to encode the AC and DC coefficients (both reference coefficients and predicted coefficients for DC, and both reference and predicted gain and angle θ for AC coefficients); maximum values for AC and DC coefficients (reference and predicted); quantisation levels, including the parameter K used for vector quantisation of the AC coefficients; the size of the macroblock; whether or not to operate in a DC only mode; the number of repetitions of the header; whether or not to operate error concealment algorithms such as the Wiener error concealment technique; the number of times the fixed length used for the purposes of EREC is repeated; the maximum length of a binary slice; whether or not the blocks are split into sets (such as the interlocking checkerboard sets illustrated in FIG. 6); the length of any synchronisation words used; the bit stuffing frequency used during EREC processing; whether or not the transmitted bit stream should be split into uniform size packets, and, if so, what size the packets should be; whether or not the overall binary length of the encoded image should be fixed, and if so, to what length (image quality being reduced as necessary to enable the length restriction to be met); and the number of portions into which an image is split.

In one example, the encoding and decoding has been implemented on a reference design board having 1.2 GHz CPU Cores, Platform 600 MHz and DDR3 memory 800 MHZ, and containing two e500v2 cores. As noted above, a benefit of processing in independent image portions is that multiple asynchronous cores can be used to significantly increase processing throughput.

Transmission of the encoded image can be performed by a separate, dedicated transmission apparatus. The dedicated transmission apparatus may be a separate processor coupled to an appropriate transmitter and antenna. In some examples, it is expected that the method for encoding an image may be performed on an aerospace platform such as an unmanned air vehicle or a missile. In such a system the encoding may be performed on an image processor receiving images from an imaging sensor, such as a camera operating in the visible or infra-red wavelength bands. Interleaving can be performed on the image processor. An encoded image file can then be passed to a second processor linked to the platform's communication antenna, and the image transmitted to a ground station, or to a remote operator. As described above, performing the interleaving on the first processor reduces latency in the transmission of the images, as well as providing additional resilience, particularly to burst errors.

Figure 17:
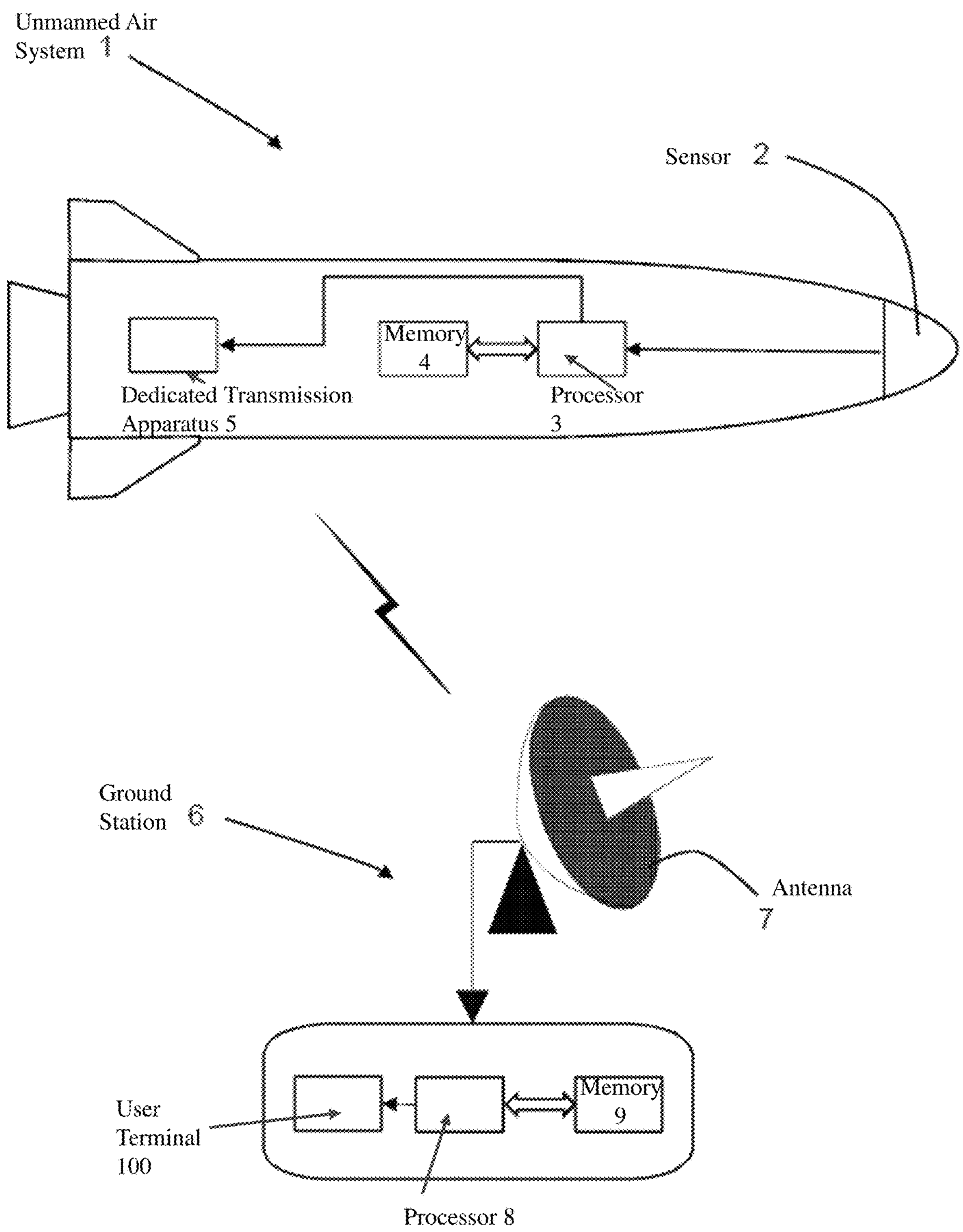
FIG. 17 is a schematic illustration of a platform and a ground station in communication to transmit an image encoded using a method according to an example of the present invention from the platform to the ground station.

FIG. 17 is a schematic illustration of such an exemplary system. An unmanned air system such as a missile 1 comprises a sensor 2 that is operable to capture images of its field of view. The sensor outputs image data to a first processor 3 which is in communication with a memory 4. The image data may for example comprise a number of pixels, each pixel defining an intensity value for a small component area of the image. For a greyscale image, each pixel need only define one intensity value. The processor 3 operates to encode the image data into a bit stream which may be stored in memory 4 for later transmission, or which can be passed to a dedicated transmission apparatus 5 for wireless transmission to ground station 6. Dedicated transmission apparatus 5 can include both an antenna for transmitting signals and a second processor for controlling the transmission process. Ground station 6 comprises an antenna 7 for receiving communications such as the bit stream encoding the image from unmanned air system 1. The antenna 7 passes received data to a processor 8, which is operable to decode the image. The decoded image may be stored in memory 9. In some examples the decoded image may be processed further by processor 8, for example to track a target through a series of images in a video stream received from unmanned air system. In some examples the decoded image may be displayed to a user for human analysis. For this purpose a user terminal 100 is provided in communication with the processor 8. In other examples the decoded image may be output to another system for further analysis.

Disruption during wireless transmission of the bit stream from the unmanned air system 1 to the ground station 6 can result in errors in the bit stream received at the ground station 6. The impact of these errors on the useability of the image can be mitigated through altering the coding used for the image, for example using the techniques described below.

Whilst in the above a number of specific embodiments of the invention have been described, it will be appreciated by those skilled in the art that variations and modifications may be made to the above described embodiments without departing from the scope of the invention, which is defined in the accompanying claims. For example, whilst in the above the use of the encoder is described with reference to monochromatic images, it will be appreciated that the encoder and decoder can also be applied to colour images, or to multi-spectral images, or to hyper-spectral images. Colour images can be encoded using standard techniques for representing colour in image data in which separate channels are used to represent different colour components of an image; or by using a YUV-type colour space, in which the Y channel represents a grayscale image comprising a weighted sum of the red, green, and blue components, and the U and V channels represent data obtained by subtracting the Y signal from the blue and red components respectively. Such techniques exploit the correlation between the different colour components that is common in visible imagery. Similar techniques may also be appropriate for different image modalities.

It will also be appreciated that, whilst in the above it has been described to use image portions in the form of strips, any shape of image portion can be used. For example, the image portions could be in the form of columns; or in the shape of squares or rectangles.

It will also be appreciated that, whilst a specific order of processing steps has been described in the above, in certain cases it may be possible to vary the order in which the steps are applied. For example, whilst it has been described to apply prediction before quantisation, it will also be possible to apply quantisation before prediction. It will also be possible to apply downsampling at a different stage of the overall coding process. For example, downsampling may be performed as a first step, before processing of the image into image portions.

It will also be appreciated that alternative methods can be used to implement certain processing steps. For example, other frequency based transforms can be used in place of the discrete cosine transform. Such transforms may include for example the discrete sine transform; a discrete wavelet transform, such as for example the Haar, Daubechies, Coiflets, Symlets, Fejer-Korovkin, discrete Meyer, biorthogonal, or reverse biorthogonal; the discrete Fourier transform; the Walsh-Hadamard transform; the Hilbert transform; or the discrete Hartley transform.

Whilst, in the above, it has been described to use an objective function that models end-to-end channel distortion when optimising the lapped filter, it will be understood that other objective functions can also be used in the optimisation process. For example, an objective function can be used to obtain a maximum in an image quality metric. Alternatively, an objective function that relates to distortion in the coded image can be minimised. Such an objective function does not take account of transmission errors, but may be appropriate where transmission errors are difficult to model or unknown.

Whilst it has been described in the above to use a block interleaver to distribute the binary stream amongst data packets for transmission, it will also be appreciated that other interleaving methods can be used. For example, a random interleaver can be used. A random interleaver creates an array, in which each array element contains its own index. The array is then randomly shuffled to produce an array of randomly arranged indexes. When copying the binary stream into the interleaved binary stream, each element of the stream reads the random index assigned in the random array, and is then copied to that index in the interleaved binary stream. When receiving the data, the opposite is performed. The header information in the transmitted data packets may then contain information determining how to reconstruct the array at the decoder. Such a random interleave process may for example be used to provide additional security to the data stream during transmission, since a seed used to generate the random array could be stored at the encoder and decoder, and not transmitted. The interleave process may alternatively be omitted.

Finally, it should be clearly understood that any feature described above in relation to any one embodiment may be used alone, or in combination with other features described, and may also be used in combination with one or more features of any other of the embodiments, or any combination of any other of the embodiments.

The invention claimed is:

1. A method for encoding data defining an image, the method comprising the steps of:

(a) segmenting the image into image blocks, the image blocks having a uniform block size;

(b) applying a frequency-based transform to each of the image blocks, thereby providing transformed image data in which the image data is represented as coefficients defining a linear combination of predetermined basis functions having different spatial frequencies; such that each block of transformed image data comprises one zero-frequency coefficient for a zero frequency basis function, and one or more sub-bands of higher-frequency coefficients, each of the one or more sub-bands comprising a number of coefficients for a predetermined set of the higher frequency basis functions;

(c) grouping the blocks of transformed image data into slices, each slice comprising a plurality of blocks of transformed image data;

(d) converting the coefficients into bits of binary code, the zero-frequency coefficients being converted to binary code using a fixed length coding scheme, and the higher frequency coefficients being converted to binary code using a variable length coding scheme;

and, for each slice, allocating the bits representing said each slice to a position in a bitstream using an allocation method, the allocation method comprising:

(i) defining a number of bins in the bitstream, the bins each having a uniform size, and each of the bins having an associated one of the plurality of blocks;

(ii) allocating bits representing a selected one of the one or more sub-bands of each of the plurality of blocks to the bin associated with said each of the plurality of blocks;

(iii) if the number of bits in a first of the bins is greater than the uniform size, transferring excess bits to a second of the bins, the second of the bins being selected according to a predetermined order;

the allocation method being such that each bin starts with bits representing its associated block; and repeating the allocation method for all of the one or more sub-bands.

2. The method of claim 1, wherein the allocation method is repeated iteratively, and the allocation method is terminated after a predetermined number of iterations have been completed.

3. The method of claim 1, wherein the number of bins is equal to the number of blocks in the slice.

4. The method of claim 1, further comprising the step of grouping the blocks into two or more sets of blocks, prior to grouping the blocks into slices.

5. The method of claim 4, wherein the step of grouping the blocks into two or more sets of blocks is performed such that the blocks in any one of the sets do not share any boundaries.

6. The method of claim 5, wherein there are two sets of blocks, and the two sets interlock.

7. The method of claim 4, wherein each slice comprises a number of consecutive blocks in one of the sets of blocks.

8. The method of claim 1, wherein each slice comprises a reference block, and the method further comprising the step of replacing the each of the coefficients in subsequent blocks in said each slice with a prediction, the prediction being based on a corresponding coefficient in the reference block.

9. The method of claim 1, wherein the step of converting the higher frequency coefficients into binary code comprises applying binary arithmetic coding using a probability model.

10. The method of claim 9, wherein the probability model is tailored based on a sample set of representative images.

11. The method of claim 1, wherein the coefficients for each of the one or more sub-bands are arranged in a predetermined order so as to form a vector, which vector has a gain and a unit length direction, and wherein the unit length direction is quantised by constraining its component terms to be integers, and constraining a sum of those component terms to be equal to a predetermined value K.

12. The method of claim 1, further comprises inserting, at the end of the bits representing a selected one of the one or more sub-bands of each of the plurality of blocks, an end of slice code word.

13. A method of decoding a bit stream to reconstruct an image, which image has been encoded according to the method of claim 1, the method of decoding comprising inverting the steps performed in encoding the image.

14. The method of claim 13, wherein the image has been encoded where the coefficients for each of the one or more sub-bands are arranged in a predetermined order so as to form a vector, which vector has a gain and a unit length direction, and wherein the unit length direction is quantised by constraining its component terms to be integers, and constraining a sum of those component terms to be equal to a predetermined value K; and wherein the method of decoding comprises inverting the steps performed in encoding the image; and the method further comprising the step of checking that the component terms sum to the predetermined value K.

15. The method of claim 14, wherein, if the component terms do not sum to the predetermined value K, an error is identified.

16. The method of claim 14, wherein, if the component terms do not sum to the predetermined value K, the largest component term is adjusted such that the component terms sum to the predetermined value K.

17. The method of claim 13, wherein the image has been encoded where each slice comprises a reference block, and the encoding further comprising the step of replacing the each of the coefficients in subsequent blocks in said each slice with a prediction, the prediction being based on a corresponding coefficient in the reference block; and wherein the method of decoding comprises inverting the steps performed in encoding the image; and the method further comprises imposing a cap on a magnitude of predicted coefficients.

18. A method of encoding a series of image frames including at least a current frame and a preceding frame, each of the frames being encoded according to the method of claim 1.

19. One or more non-transitory computer-readable medium having stored thereon data defining an image, which data has been encoded according to the method of claim 1.

20. One or more non-transitory computer-readable medium comprising instructions which, when the instructions are executed by a computer, cause the computer to carry out the method of claim 1.

* * * * *